US011252716B2

(12) United States Patent
Nammi et al.

(10) Patent No.: US 11,252,716 B2
(45) Date of Patent: *Feb. 15, 2022

(54) FACILITATING UPLINK COMMUNICATION WAVEFORM SELECTION

(71) Applicant: AT&T Intellectual Property I, L.P., Atlanta, GA (US)

(72) Inventors: Sairamesh Nammi, Kista (SE); Arunabha Ghosh, Austin, TX (US); Xiaoyi Wang, Austin, TX (US); Milap Majmundar, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 26 days.

This patent is subject to a terminal disclaimer.

(21) Appl. No.: 16/789,609

(22) Filed: Feb. 13, 2020

(65) Prior Publication Data

US 2020/0187202 A1 Jun. 11, 2020

Related U.S. Application Data

(63) Continuation of application No. 15/376,209, filed on Dec. 12, 2016, now Pat. No. 10,602,507.
(Continued)

(51) Int. Cl.
*H04W 72/04* (2009.01)
*H04L 5/00* (2006.01)
(Continued)

(52) U.S. Cl.
CPC ...... *H04W 72/0433* (2013.01); *H04B 17/336* (2015.01); *H04L 1/0001* (2013.01);
(Continued)

(58) Field of Classification Search
CPC .............. H04B 17/336; H04L 1/0001; H04L 25/03828; H04L 27/26025; H04L 27/264;
(Continued)

(56) References Cited

U.S. PATENT DOCUMENTS 7,002,949 B2   2/2006   Garcia-luna-aceves et al.
7,020,110 B2   3/2006   Walton et al.
(Continued)

FOREIGN PATENT DOCUMENTS

CN   1627849 A   6/2005
CN   101300858 A   11/2008
(Continued)

OTHER PUBLICATIONS

Non-Final Office Action received for U.S. Appl. No. 16/174,854 dated Aug. 29, 2019, 48 pages.
(Continued)

*Primary Examiner* — Dung B Huynh
(74) *Attorney, Agent, or Firm* — Amin, Turocy & Watson, LLP

(57) ABSTRACT

The disclosed subject matter relates to facilitating uplink communication waveform selection in wireless communication systems, and more particularly Fifth Generation (5G) wireless communication systems. In one or more embodiments, a system is provided comprising a processor and a memory that stores executable instructions that, when executed by the processor, facilitate performance of operations. These operations can comprise facilitating establishing a wireless communication link between a first device and a second network device of a wireless communication network, and determining a waveform filtering protocol for application by the first device in association with performance of uplink data transmissions from the first device to the second network device.

18 Claims, 10 Drawing Sheets

Related U.S. Application Data

(60) Provisional application No. 62/401,872, filed on Sep. 29, 2016.

(51) Int. Cl.
*H04L 27/26* (2006.01)
*H04L 1/00* (2006.01)
*H04B 17/336* (2015.01)
*H04W 76/10* (2018.01)
*H04W 4/02* (2018.01)
*H04W 24/08* (2009.01)
*H04L 25/03* (2006.01)

(52) U.S. Cl.
CPC ............ *H04L 5/003* (2013.01); *H04L 5/0064* (2013.01); *H04L 5/0069* (2013.01); *H04L 5/0085* (2013.01); *H04L 5/0089* (2013.01); *H04L 27/264* (2013.01); *H04W 4/023* (2013.01); *H04W 24/08* (2013.01); *H04W 76/10* (2018.02); *H04L 5/006* (2013.01); *H04L 5/0087* (2013.01); *H04L 5/0094* (2013.01); *H04L 5/0096* (2013.01); *H04L 25/03828* (2013.01)

(58) Field of Classification Search
CPC ... H04L 27/26414; H04L 5/003; H04L 5/006; H04L 5/0064; H04L 5/0069; H04L 5/0085; H04L 5/0087; H04L 5/0089; H04L 5/0094; H04L 5/0096; H04L 5/0078–0089; H04W 24/08; H04W 4/023; H04W 72/0433; H04W 76/10
See application file for complete search history.

(56) References Cited

U.S. PATENT DOCUMENTS

| | | | |
|---|---|---|---|
| 7,209,443 B2 | 4/2007 | Mukai et al. | |
| 7,260,366 B2 | 8/2007 | Lee et al. | |
| 7,551,546 B2 | 6/2009 | Ma et al. | |
| 7,636,573 B2 | 12/2009 | Walton et al. | |
| 7,698,463 B2 | 4/2010 | Ogier et al. | |
| 7,877,067 B2 | 1/2011 | Hwang et al. | |
| 7,907,512 B1 | 3/2011 | von der Embse | |
| 7,953,046 B2* | 5/2011 | Takashima | H04L 5/0007 370/332 |
| 8,018,889 B2 | 9/2011 | Lim et al. | |
| 8,040,844 B2 | 10/2011 | Olexa et al. | |
| 8,055,269 B2 | 11/2011 | Feher | |
| 8,102,794 B2 | 1/2012 | Shin et al. | |
| 8,159,399 B2 | 4/2012 | Dorsey et al. | |
| 8,165,536 B2 | 4/2012 | Sekiya et al. | |
| 8,189,577 B2 | 5/2012 | Vaswani et al. | |
| 8,218,550 B2 | 7/2012 | Axelsson et al. | |
| 8,265,012 B2* | 9/2012 | Jung | H04L 1/0017 370/329 |
| 8,271,043 B2 | 9/2012 | Kim et al. | |
| 8,300,555 B2 | 10/2012 | Horn et al. | |
| 8,306,525 B2 | 11/2012 | Feher | |
| 8,423,068 B2 | 4/2013 | Tiwari et al. | |
| 8,509,060 B1 | 8/2013 | Dong et al. | |
| 8,516,121 B1* | 8/2013 | Telang | H04L 47/25 709/226 |
| 8,537,658 B2 | 9/2013 | Sayana et al. | |
| 8,537,714 B2 | 9/2013 | Liu | |
| 8,553,560 B2 | 10/2013 | Axelsson et al. | |
| 8,578,054 B2 | 11/2013 | Thubert et al. | |
| 8,665,797 B2 | 3/2014 | Ding et al. | |
| 8,681,747 B2 | 3/2014 | Dateki et al. | |
| 8,711,716 B2 | 4/2014 | Chen et al. | |
| 8,761,834 B2 | 6/2014 | Luz et al. | |
| 8,774,154 B2 | 7/2014 | Bui | |
| 8,787,257 B2 | 7/2014 | Fujita | |
| 8,798,011 B2 | 8/2014 | Prasad et al. | |
| 8,854,997 B2 | 10/2014 | Clow et al. | |
| 8,873,496 B2 | 10/2014 | Moulsley et al. | |
| 8,929,196 B2 | 1/2015 | Novak et al. | |
| 8,948,046 B2 | 2/2015 | Kang et al. | |
| 8,964,703 B2* | 2/2015 | Chen | H04L 5/0007 370/335 |
| 9,007,992 B2 | 4/2015 | Charbit et al. | |
| 9,013,974 B2 | 4/2015 | Walton et al. | |
| 9,019,068 B2 | 4/2015 | Varoglu | |
| 9,037,076 B2 | 5/2015 | Nagata et al. | |
| 9,059,753 B2 | 6/2015 | Fang et al. | |
| 9,078,187 B2 | 7/2015 | Huh | |
| 9,084,261 B2 | 7/2015 | Gholmieh et al. | |
| 9,094,145 B2 | 7/2015 | Fue et al. | |
| 9,154,198 B2 | 10/2015 | El-Najjar et al. | |
| 9,154,210 B2 | 10/2015 | Li et al. | |
| 9,155,098 B2 | 10/2015 | Geirhofer et al. | |
| 9,161,381 B2 | 10/2015 | Lee et al. | |
| 9,184,870 B2 | 11/2015 | Sampath et al. | |
| 9,191,098 B2 | 11/2015 | Kazmi et al. | |
| 9,215,322 B1 | 12/2015 | Wu et al. | |
| 9,240,871 B2 | 1/2016 | Walton et al. | |
| 9,241,311 B2 | 1/2016 | Sebeni et al. | |
| 9,246,651 B2 | 1/2016 | Guo et al. | |
| 9,265,053 B2 | 2/2016 | Blankenship et al. | |
| 9,288,719 B2 | 3/2016 | Hui et al. | |
| 9,306,725 B2 | 4/2016 | Papasakellariou et al. | |
| 9,307,489 B2 | 4/2016 | Yerrabommanahalli et al. | |
| 9,313,747 B2 | 4/2016 | Zhu et al. | |
| 9,337,970 B2 | 5/2016 | Hammarwall et al. | |
| 9,338,769 B1 | 5/2016 | Naim et al. | |
| 9,345,037 B2 | 5/2016 | Ode | |
| 9,357,472 B2 | 5/2016 | Mukherjee | |
| 9,401,750 B2 | 7/2016 | Sayana et al. | |
| 9,408,220 B2 | 8/2016 | Gore et al. | |
| 9,413,509 B2 | 8/2016 | Chen et al. | |
| 9,414,427 B2 | 8/2016 | Yang et al. | |
| 9,420,577 B2 | 8/2016 | Kim et al. | |
| 9,432,876 B2 | 8/2016 | Ji et al. | |
| 9,451,476 B2 | 9/2016 | Shoshan et al. | |
| 9,467,909 B2 | 10/2016 | Faerber et al. | |
| 9,510,340 B2 | 11/2016 | Kim et al. | |
| 9,602,183 B2 | 3/2017 | Kim et al. | |
| 9,742,480 B1 | 8/2017 | Nammi et al. | |
| 9,936,517 B2* | 4/2018 | Kotecha | H04W 72/1242 |
| 10,027,401 B2 | 7/2018 | Speight et al. | |
| 10,680,864 B2* | 6/2020 | Zhang | H04L 27/2602 |
| 10,749,644 B2* | 8/2020 | Islam | H04L 5/0007 |
| 2003/0039217 A1 | 2/2003 | Seo et al. | |
| 2003/0043756 A1 | 3/2003 | Reynders et al. | |
| 2004/0162048 A1 | 8/2004 | Milbar et al. | |
| 2004/0218604 A1 | 11/2004 | Porter | |
| 2004/0253955 A1 | 12/2004 | Love et al. | |
| 2004/0255040 A1 | 12/2004 | Lopes et al. | |
| 2005/0036487 A1 | 2/2005 | Srikrishna | |
| 2005/0250506 A1 | 11/2005 | Beale et al. | |
| 2006/0240777 A1 | 10/2006 | Ruuska | |
| 2007/0060178 A1* | 3/2007 | Gorokhov | H04L 5/1438 455/506 |
| 2007/0110198 A1 | 5/2007 | Skarby et al. | |
| 2007/0160156 A1 | 7/2007 | Melzer et al. | |
| 2007/0253496 A1 | 11/2007 | Giannakis et al. | |
| 2007/0274252 A1* | 11/2007 | Zhang | H04L 5/0064 370/328 |
| 2007/0288618 A1 | 12/2007 | Yeo et al. | |
| 2008/0002723 A1 | 1/2008 | Pusateri | |
| 2008/0049851 A1* | 2/2008 | Nangia | H04B 1/7103 375/260 |
| 2008/0095223 A1 | 4/2008 | Tong et al. | |
| 2008/0159214 A1* | 7/2008 | Majonen | H04L 1/0026 370/329 |
| 2008/0232240 A1* | 9/2008 | Baum | H04W 88/00 370/210 |
| 2009/0029645 A1 | 1/2009 | Leroudier | |
| 2009/0052448 A1 | 2/2009 | Ramakrishnan et al. | |
| 2009/0073922 A1 | 3/2009 | Malladi et al. | |
| 2009/0122884 A1* | 5/2009 | Vook | H04B 7/0689 375/260 |

(56) References Cited

U.S. PATENT DOCUMENTS

| | | |
|---|---|---|
| 2009/0168915 A1 | 7/2009 | Aoki et al. |
| 2009/0262673 A1 | 10/2009 | Hermersdorf |
| 2009/0295623 A1 | 12/2009 | Falk |
| 2009/0296802 A1 | 12/2009 | Ermolayev et al. |
| 2010/0002675 A1 | 1/2010 | Fu et al. |
| 2010/0027502 A1* | 2/2010 | Chen ................ H04W 72/0486 370/330 |
| 2010/0067591 A1 | 3/2010 | Luo et al. |
| 2010/0111030 A1* | 5/2010 | Almgren ............... H04L 5/0064 370/330 |
| 2010/0178057 A1 | 7/2010 | Shieh |
| 2010/0202322 A1 | 8/2010 | Cai et al. |
| 2010/0238826 A1 | 9/2010 | Borran et al. |
| 2010/0260126 A1 | 10/2010 | Ulupinar et al. |
| 2011/0034198 A1* | 2/2011 | Chen .................. H04L 25/0202 455/509 |
| 2011/0039495 A1 | 2/2011 | Sawai et al. |
| 2011/0044262 A1 | 2/2011 | Satapathy et al. |
| 2011/0085513 A1 | 4/2011 | Chen et al. |
| 2011/0096727 A1 | 4/2011 | Bergman et al. |
| 2011/0176445 A1 | 7/2011 | Chen |
| 2011/0222525 A1* | 9/2011 | Kishigami ............ H04L 5/0094 370/343 |
| 2011/0281579 A1 | 11/2011 | Kummetz |
| 2011/0305161 A1 | 12/2011 | Ekpenyong et al. |
| 2012/0002598 A1 | 1/2012 | Seo et al. |
| 2012/0013564 A1 | 1/2012 | Westhues et al. |
| 2012/0020230 A1* | 1/2012 | Chen .................... H04W 24/08 370/252 |
| 2012/0033625 A1* | 2/2012 | Nagata ................... H04L 5/003 370/329 |
| 2012/0087276 A1 | 4/2012 | Huang et al. |
| 2012/0093109 A1 | 4/2012 | Dong et al. |
| 2012/0106472 A1* | 5/2012 | Rosa .................... H04L 5/0073 370/329 |
| 2012/0147810 A1 | 6/2012 | Wang et al. |
| 2012/0327757 A1 | 12/2012 | Wang et al. |
| 2012/0327794 A1 | 12/2012 | Han et al. |
| 2013/0003604 A1 | 1/2013 | Blankenship et al. |
| 2013/0028128 A1* | 1/2013 | Novak ................. H04B 17/382 370/252 |
| 2013/0028241 A1 | 1/2013 | Wang et al. |
| 2013/0044673 A1 | 2/2013 | Bi et al. |
| 2013/0044707 A1 | 2/2013 | Chen |
| 2013/0064207 A1* | 3/2013 | Wang .................... H04B 7/0456 370/329 |
| 2013/0095748 A1 | 4/2013 | Hu et al. |
| 2013/0142136 A1 | 6/2013 | Pi et al. |
| 2013/0155831 A1 | 6/2013 | Kim et al. |
| 2013/0210447 A1* | 8/2013 | Moe ...................... H04W 28/16 455/453 |
| 2013/0215844 A1 | 8/2013 | Seol et al. |
| 2013/0235808 A1 | 9/2013 | Earnshaw et al. |
| 2013/0242902 A1 | 9/2013 | Liu et al. |
| 2013/0258973 A1 | 10/2013 | Khoshnevis et al. |
| 2013/0301628 A1 | 11/2013 | Dacosta et al. |
| 2013/0336199 A1 | 12/2013 | Schwartz et al. |
| 2013/0337795 A1 | 12/2013 | Falconetti et al. |
| 2014/0010126 A1 | 1/2014 | Sayana et al. |
| 2014/0016534 A1 | 1/2014 | Kim et al. |
| 2014/0044061 A1 | 2/2014 | Yue et al. |
| 2014/0056272 A1* | 2/2014 | Gao ...................... H04L 1/0035 370/329 |
| 2014/0064160 A1 | 3/2014 | Verger et al. |
| 2014/0073339 A1 | 3/2014 | Tang |
| 2014/0086063 A1 | 3/2014 | Wu |
| 2014/0119333 A1* | 5/2014 | Hedlund ............... H04L 5/0007 370/330 |
| 2014/0146754 A1 | 5/2014 | Bayesteh et al. |
| 2014/0189155 A1 | 7/2014 | Morris |
| 2014/0201324 A1* | 7/2014 | Zhang .................. H04L 67/42 709/217 |
| 2014/0269552 A1 | 9/2014 | Saito |
| 2014/0281670 A1 | 9/2014 | Vasseur et al. |
| 2014/0293987 A1 | 10/2014 | Zhu et al. |
| 2014/0376476 A1* | 12/2014 | Morita ................... H04B 7/024 370/329 |
| 2015/0009888 A1 | 1/2015 | Pitakdumrongkija et al. |
| 2015/0031284 A1 | 1/2015 | Pitakdumrongkija et al. |
| 2015/0071075 A1* | 3/2015 | Ramakrishnan ... H04N 21/2401 370/236 |
| 2015/0071233 A1* | 3/2015 | Wang .................... H04L 5/0094 370/329 |
| 2015/0071242 A1 | 3/2015 | Vilaipornsawai et al. |
| 2015/0092695 A1 | 4/2015 | Zhao et al. |
| 2015/0110029 A1* | 4/2015 | Hwang ................. H04L 1/0031 370/329 |
| 2015/0139208 A1 | 5/2015 | Chan et al. |
| 2015/0146655 A1 | 5/2015 | Hui et al. |
| 2015/0155993 A1 | 6/2015 | Berggren et al. |
| 2015/0156082 A1* | 6/2015 | Kakadia ................. H04L 47/50 709/223 |
| 2015/0171944 A1 | 6/2015 | Kalhan |
| 2015/0181534 A1 | 6/2015 | Andersson et al. |
| 2015/0188650 A1 | 7/2015 | Au et al. |
| 2015/0215085 A1 | 7/2015 | Xu et al. |
| 2015/0244499 A1 | 8/2015 | Alexander |
| 2015/0245272 A1 | 8/2015 | Lindoff et al. |
| 2015/0249998 A1 | 9/2015 | Long et al. |
| 2015/0282150 A1 | 10/2015 | Nigam et al. |
| 2015/0312920 A1 | 10/2015 | Hu et al. |
| 2015/0326422 A1 | 11/2015 | Sagong et al. |
| 2015/0333878 A1 | 11/2015 | Yu et al. |
| 2015/0334643 A1 | 11/2015 | Maaref et al. |
| 2015/0341093 A1 | 11/2015 | Ji et al. |
| 2015/0341100 A1 | 11/2015 | Kwak et al. |
| 2015/0341141 A1* | 11/2015 | Pajukoski ........... H03M 13/353 714/776 |
| 2015/0349996 A1 | 12/2015 | Vilaipornsawai et al. |
| 2015/0351098 A1* | 12/2015 | Schellmann ...... H04W 72/0453 370/329 |
| 2015/0382275 A1 | 12/2015 | Pragada et al. |
| 2016/0006487 A1 | 1/2016 | Ding et al. |
| 2016/0014626 A1 | 1/2016 | Yi et al. |
| 2016/0014762 A1 | 1/2016 | Ji et al. |
| 2016/0028520 A1 | 1/2016 | Nogami et al. |
| 2016/0029359 A1 | 1/2016 | Agiwal et al. |
| 2016/0050039 A1 | 2/2016 | Ma et al. |
| 2016/0080187 A1 | 3/2016 | Yun et al. |
| 2016/0080961 A1 | 3/2016 | Kim et al. |
| 2016/0080963 A1 | 3/2016 | Marinier et al. |
| 2016/0087694 A1 | 3/2016 | Vilaipornsawai et al. |
| 2016/0088521 A1 | 3/2016 | Ho et al. |
| 2016/0119097 A1 | 4/2016 | Nam et al. |
| 2016/0119931 A1 | 4/2016 | Soriaga et al. |
| 2016/0128028 A1 | 5/2016 | Mallik et al. |
| 2016/0128034 A1 | 5/2016 | Choi et al. |
| 2016/0128072 A1 | 5/2016 | Rajagopal et al. |
| 2016/0142117 A1 | 5/2016 | Rahman et al. |
| 2016/0142292 A1 | 5/2016 | Au et al. |
| 2016/0149686 A1* | 5/2016 | Tsai ...................... H04L 1/1874 370/329 |
| 2016/0154756 A1 | 6/2016 | Dodson et al. |
| 2016/0173244 A1 | 6/2016 | Ding |
| 2016/0183242 A1 | 6/2016 | Cordeiro et al. |
| 2016/0191216 A1 | 6/2016 | Ma et al. |
| 2016/0198471 A1* | 7/2016 | Young .................. H04W 16/14 370/329 |
| 2016/0211999 A1 | 7/2016 | Wild et al. |
| 2016/0233938 A1 | 8/2016 | Mondal et al. |
| 2016/0254889 A1 | 9/2016 | Shattil |
| 2016/0255631 A1* | 9/2016 | Cui ...................... H04W 72/1242 370/329 |
| 2016/0255667 A1 | 9/2016 | Schwartz |
| 2016/0262118 A1 | 9/2016 | Kim et al. |
| 2016/0269135 A1 | 9/2016 | Jiang et al. |
| 2016/0269212 A1 | 9/2016 | Vilaipornsawai et al. |
| 2016/0285611 A1 | 9/2016 | Fischer et al. |
| 2016/0294521 A1 | 10/2016 | Au et al. |
| 2016/0301505 A1 | 10/2016 | Furuskog et al. |
| 2016/0316458 A1* | 10/2016 | Kwon ................... H04L 5/0053 |
| 2016/0352543 A1 | 12/2016 | Hu et al. |

(56) References Cited

U.S. PATENT DOCUMENTS

| | | |
|---|---|---|
| 2016/0352551 A1 | 12/2016 | Zhang et al. |
| 2016/0353374 A1 | 12/2016 | Hoglund et al. |
| 2016/0353420 A1 | 12/2016 | You et al. |
| 2016/0353453 A1 | 12/2016 | Au et al. |
| 2016/0353475 A1 | 12/2016 | Au et al. |
| 2017/0019847 A1 | 1/2017 | Han et al. |
| 2017/0078054 A1 | 3/2017 | Hadani et al. |
| 2017/0078826 A1 | 3/2017 | Cui et al. |
| 2017/0118054 A1* | 4/2017 | Ma .................. H04L 5/0064 |
| 2017/0126299 A1 | 5/2017 | Wei et al. |
| 2017/0126458 A1 | 5/2017 | Shattil |
| 2017/0134205 A1 | 5/2017 | Kim et al. |
| 2017/0135084 A1* | 5/2017 | Kuchibhotla ......... H04W 24/08 |
| 2017/0163456 A1 | 6/2017 | Chen |
| 2017/0188366 A1* | 6/2017 | Zhang ................ H04L 1/0006 |
| 2017/0215170 A1* | 7/2017 | Islam ................ H04L 27/2601 |
| 2017/0223700 A1 | 8/2017 | Thubert et al. |
| 2017/0237537 A1 | 8/2017 | Nogami et al. |
| 2017/0257238 A1 | 9/2017 | Qian et al. |
| 2017/0257860 A1 | 9/2017 | Nam et al. |
| 2017/0265119 A1 | 9/2017 | Fang |
| 2017/0272210 A1 | 9/2017 | Zhang |
| 2017/0288928 A1 | 10/2017 | Xu et al. |
| 2017/0311188 A1 | 10/2017 | Sun et al. |
| 2017/0318565 A1 | 11/2017 | Golitschek Edler von Elbwart et al. |
| 2017/0325246 A1 | 11/2017 | Agarwal et al. |
| 2017/0331577 A1 | 11/2017 | Parkvall et al. |
| 2017/0353222 A1* | 12/2017 | Wei .................. H04B 7/0469 |
| 2017/0367046 A1 | 12/2017 | Papasakellariou |
| 2017/0374558 A1 | 12/2017 | Zhao et al. |
| 2018/0007696 A1 | 1/2018 | Hasarchi et al. |
| 2018/0014320 A1 | 1/2018 | Xu et al. |
| 2018/0035423 A1 | 2/2018 | Wang et al. |
| 2018/0035459 A1 | 2/2018 | Islam et al. |
| 2018/0049047 A1* | 2/2018 | Lin .................... H04W 24/02 |
| 2018/0049169 A1* | 2/2018 | Lin .................... H04L 5/0051 |
| 2018/0049233 A1 | 2/2018 | Luo et al. |
| 2018/0049236 A1 | 2/2018 | Sun et al. |
| 2018/0062823 A1 | 3/2018 | Hasegawa |
| 2018/0063818 A1 | 3/2018 | Chen et al. |
| 2018/0063865 A1* | 3/2018 | Islam ................ H04L 5/0064 |
| 2018/0070341 A1* | 3/2018 | Islam ................ H04L 1/1887 |
| 2018/0092095 A1 | 3/2018 | Zeng et al. |
| 2018/0097598 A1 | 4/2018 | Ang et al. |
| 2018/0152269 A1* | 5/2018 | Xiong ................ H04W 72/005 |
| 2018/0167933 A1 | 6/2018 | Yin et al. |
| 2018/0176000 A1 | 6/2018 | Lee et al. |
| 2018/0176059 A1 | 6/2018 | Medles et al. |
| 2018/0184410 A1 | 6/2018 | Wilson et al. |
| 2018/0191473 A1* | 7/2018 | Ashraf ................ H04L 5/0007 |
| 2018/0199341 A1* | 7/2018 | Baldemair ........... H04L 5/0091 |
| 2018/0219606 A1 | 8/2018 | Ng et al. |
| 2018/0220400 A1 | 8/2018 | Nogami et al. |
| 2018/0227156 A1 | 8/2018 | Papasakellariou |
| 2018/0234877 A1* | 8/2018 | Liu ................... H04W 28/0268 |
| 2019/0097861 A1* | 3/2019 | Kawasaki ............ H04W 72/02 |
| 2019/0104549 A1* | 4/2019 | Deng .................. H04B 7/0617 |
| 2019/0208482 A1* | 7/2019 | Tooher ................ H04L 27/2607 |

FOREIGN PATENT DOCUMENTS

| | | |
|---|---|---|
| CN | 101438611 A | 5/2009 |
| CN | 101631355 A | 1/2010 |
| CN | 102612074 A | 7/2012 |
| CN | 102647386 A | 8/2012 |
| CN | 103391573 A | 11/2013 |
| CN | 104010343 A | 8/2014 |
| CN | 104168620 A | 11/2014 |
| CN | 104486042 A | 4/2015 |
| CN | 105264787 A | 1/2016 |
| CN | 105453471 A | 3/2016 |
| CN | 105659655 A | 6/2016 |
| EP | 0 720 316 A1 | 7/1996 |
| EP | 1 998 586 A1 | 12/2008 |
| EP | 2 400 674 A2 | 12/2011 |
| EP | 2 409 517 A2 | 1/2012 |
| EP | 2 858 408 A1 | 4/2015 |
| EP | 3 065 448 A1 | 9/2016 |
| EP | 3 160 051 A1 | 4/2017 |
| JP | 2011-205679 A | 10/2011 |
| JP | 2012213165 A1 | 11/2012 |
| JP | 2013539616 A | 10/2013 |
| JP | 5373076 B2 | 12/2013 |
| JP | 2013258715 A | 12/2013 |
| JP | 2018-507607 A | 3/2018 |
| WO | 2005/064872 A1 | 7/2005 |
| WO | 2008/011717 A1 | 1/2008 |
| WO | 2013/081628 A1 | 6/2013 |
| WO | 2013/107053 A1 | 7/2013 |
| WO | 2013/136777 A1 | 9/2013 |
| WO | 2015/095844 A1 | 6/2015 |
| WO | 2015/108460 A1 | 7/2015 |
| WO | 2015/122665 A1 | 8/2015 |
| WO | 2015/140601 A1 | 9/2015 |
| WO | 2015/186974 A1 | 12/2015 |
| WO | 2016/023207 | 2/2016 |
| WO | 2016/026507 A1 | 2/2016 |
| WO | 2016/030300 A1 | 3/2016 |
| WO | 2016/065068 A2 | 4/2016 |
| WO | 2016/068628 A1 | 5/2016 |
| WO | 2016/086971 A1 | 6/2016 |
| WO | 2016/105120 A1 | 6/2016 |
| WO | 2016/115655 A1 | 7/2016 |
| WO | 2016/128728 A2 | 8/2016 |
| WO | 2016/170389 A1 | 10/2016 |

OTHER PUBLICATIONS

Non-Final Office Action received for U.S. Appl. No. 16/186,766 dated Oct. 3, 2019, 64 pages.

Non-Final Office Action received for U.S. Appl. No. 16/238,067 dated Oct. 3, 2019, 60 pages.

Notice of Allowance received for U.S. Appl. No. 15/432,515 dated Feb. 25, 2019, 27 pages.

Non-Final Office Action received for U.S. Appl. No. 15/376,209 dated May 2, 2019, 40 pages.

U.S. Appl. No. 15/376,209, filed Dec. 12, 2016.

Communication pursuant to Article 94(3) EPC received for EP Patent Application Serial No. 17778094 dated Jun. 2, 2020, 04 pages.

Notice of Reasons for Refusal received for Japanese Patent Application Serial No. 2019517275 dated May 26, 2020, 21 pages.

Notice of Reasons for Refusal received for Korean Patent Application Serial No. 20197009054 dated May 18, 2020, 11 pages.

Decision of Patent Grant received for Japanese Patent Application Serial No. 10-2019-7009108 Dated Jun. 3, 2020, 3 page.

Non-Final Office Action received for U.S. Appl. No. 15/340,744 dated Jun. 25, 2019, 32 pages.

Notification of Reason for Refusal received for Korean Patent Application Serial No. 10-2019-7009108 dated Jan. 3, 2020, 8 pages (Including English Translation).

Mogensen et al. "5G small cell optimized radio design." IEEE. 2013. http://vbn.aau.dk/files/195969578/Globecom_5G_2013_v16emb.pdf.

Peng et al. "System architecture and key technologies for 5G heterogeneous cloud radio access networks." IEEE network 29.2 (2015): 614. http://arxiv.org/pdf/1412.6677.

Mogensen et al. "Centimeterwave concept for 5G ultradense small cells." 2014 IEEE 79th Vehicular Technology Conference (VTC Spring). IEEE 2014. http://vbn.aau.dk/ws/files/203990574/MWC2020_v5.pdf.

"LI et al. "Energyoptimal scheduling with dynamic channel acquisition in wireless downlinks." IEEE Transactions on Mobile Computing 9.4 (2010): 527539. http://wwwbcf.usc.edu/~mjneely/pdf_papers/lineelycdc07.pdf".

Huynh et al. "Joint Downlink and Uplink Interference Management for Device to Device Communication Underlaying Cellular Networks." Year: 2016 vol. 4 pp. 4420 4430 DOI:10.1109/ACCESS.

(56) References Cited

OTHER PUBLICATIONS 2016.2603149 IEEE Journals & Magazines. http://ieeexplore.ieee.org/iel7/6287639/7419931/07552542.pdf.
Jungnickel et al. "The role of small cells coordinated multipoint and massive MIMO in 5G." IEEE Communications Magazine 52.5 (2014): 44-51. http://nashville.dyndns.org:823/YourFreeLibrary/_lte/Small%20Cells/smallCells1.pdf.
Nam et al. "Advanced interference management for 5G cellular networks." IEEE Communications Magazine 52.5 (2014): 52-60. https://www.researchgate.net/profile/Dongwoon_Bai/publication/262416968_Advanced_Interference_Management_for_5G_Cellular_Networks2/links/5515c7890cf2f7d80a3594b5.pdf.
Guvensen et al. "A Generalized Framework on Beamformer Design and CSI Acquisition for Single-Carrier Massive MIMO Systems in Millimeter Wave Channels." arXiv preprint arXiv:1607.01436 (2016). http://arxiv.org/pdf/1607.01436.
Björnson. "Massive MIMO for 5G." Tutorial at 2015 IEEE International Workshop SPAWC Stockholm Sweden Jun. 29, 2015. https://pdfs.semanticscholar.org/85fc/19cd9a0090c4e32f5520d8edc86b592f5178.pdf.
Yang et al. "Joint Optimization of Transceiver Matrices for MIMO-Aided Multiuser AF Relay Networks: Improving the QoS in the Presence of CSI Errors." IEEE Transactions on Vehicular Technology 65.3 (2016): 1434-1451. http://eprints.soton.ac.uk/375505/1/tvt-hanzo-2410759-proof%20(1).pdf.
Niu et al. "A survey of millimeter wave communications (mmWave) for 5G: opportunities and challenges." Wireless Networks 21.8 (2015): 2657-2676.
Miao et al. "Self-organized multi-hop millimeter-wave backhaul network: Beam alignment and dynamic routing." Networks and Communications (EuCNC) 2015 European Conference on. IEEE 2015.
Vijayakumar et al. "Review on Routing Algorithms in Wireless Mesh Networks." International Journal of Computer Science and Telecommunications 3.5 (2012): 8792. http://www.ijcst.org/Volume3/Issue5/p15_3_5.pdf.
Bemmoussat et al."Efficient routing protocol to support qos in wireless mesh network." International Journal of Wireless & Mobile Networks 4.5 (2012): 89. http://search.proquest.com/openview/be6898c2de82656d6aa1ae75b947ede0/1 ?pqorigsite= Gscholar.
Draves et al. "Routing in multiradio multihop wireless mesh networks." Proceedings of the 10th annual international conference on Mobile computing and networking. ACM 2004. http://www.cs.jhu.edu/~cs647/classpapers/ Routing/b114draves. Pdf.
Wazwaz et al. "Medium Access and Routing In Multi Hop Wireless Infrastructures." Univ. of Twente Enschede the Netherlands (2005). https://www.utwente.nl/ewi/dacs/assignments/completed/master/reports/thesi s_aymanwazwaz.pdf.
Hong, et al. "Applications of selfinterference cancellation in 5G and beyond." IEEE Communications Magazine 52.2 (2014): 114121. http://stevenhong. com/pubs/CommMag145G. pdf.
Hossain. "5G wireless communication systems." American Journal of Engineering Research (AJER) e-ISSN (2013): 2320-0847. http://www.academia.edu/download/32242528/ZP210344353.pdf.
Osseiran, et al. "Scenarios for 5G mobile and wireless communications: the vision of the METIS project." IEEE Communications Magazine 52.5 (2014): 26-35. https://www.metis2020.com/wp-content/uploads/publications /IEEEComMag_Osseiran_et_al_METIS_overview_scenarios_201405.pdf.
Hu, et al. "An energy efficient and spectrum efficient wireless heterogeneous network framework for 5G systems." IEEE Communications Magazine 52.5 (2014): 94-101. http://www.academia.edu/download/34030549 /An_Energy_Efficient_and_Spectrum_Efficient_Wireless_Heterogeneous_Network_Framework_for.
Wu, et al. "Recent advances in energy-efficient networks and their application in 5G systems." IEEE Wireless Communications 22.2 (2015): 145-151. https://www.researchgate.net/profile/Gang_Wu15/publication /275673965_Recent_advances_in_energyefficient_networks_and_their_application_in_5G_systems/links/559f3d1508ae03c44a5ce9ac.pdf.

Nakamura, et al. "5G radio access: Requirements, concept and experimental trials." IEICE Transactions on Communications 98.8 (2015): 1397-1406. https://pdfs.semanticscholar.org/68fa/40d96cf347627d2a2875777de3de1fb43223.pdf.
Kim, et al., "Interference Management via Sliding-Window Coded Modulation for 5G Cellular Networks." IEEE Communications Magazine, Nov. 2016, pp. 82-89, vol. 54, Issue 11, 8 pages.
International Search Report and Written Opinion for Application No. PCT/US2017/052582, dated Dec. 6, 2017, 16 pages.
Etri, "Potential CSI-RS and CSI feedback enhancements for EBF/FD-MIMO" 3GPP TSG RAN WG1 Meeting #19 San Francisco. USA, Nov. 11-21, 2014, 6 pages.
International Search Report and Written Opinion for Application No. PCT/US2017/052581 dated Nov. 24, 2017, 18 pages.
Nokia et al., "On System Design for Multiple Numerologies—Initial Access" 3GPP TSG-RAN WG1 #86, Gothenburg, Sweden, Aug. 22-26, 2016, 6 pages.
International Search Report and Written Opinion for Application No. PCT/US2017/052579, dated Jan. 2, 2018, 16 pages.
Qualcomm: "Forward compatibility considerations on NR Integrated Access and Backhaul", 3GPP Draft; R1-167119 3GPP TSG-RAN WG1 #86 Aug. 22-26, 2016, Gothenburg, Sweden, 5 pages.
CATT: "NR Frame Structure Design" 3GPP Draft R1-166472, 3rd Generation Partnership Project (3GPP), Mobile Competence Centre 650, Route Des Lucioles F-06921 Sophia-Antipolis Cedex France, Aug. 21, 2016, 8 pages.
NTT DOCOMO et al., "Workplan for Study on NR Access Technology" 3GPP Draft; R1-167373 Work Plan For Nr, 3GPP TSG RAN WG1 Meeting #86, Goteborg, Sweden Aug. 22-26, 2016, 30 pages.
Huawei, HiSilicon, AT&T, Samsung, Qualcomm, Ericsson, ASTRI, [ . . . ] "WF on Integrated Backhaul and Access", 3GPP Draft; R1-168429 3GPP TSG RAN WG1 Meeting #86 Gothenburg, Sweden, Aug. 22-26, 2016, 6 pages.
Invitation to Pay Additional Fees And, where Applicable, Protest Fee issued for Application No. PCT/US2017/052578 on Nov. 30, 2017, 18 pages.
Graffi et al., "Monitoring and Management of Structured Peer-to-Peer Systems", IEEE P2P'09—Sep. 9-11, 2009, pp. 311-320.
Acampora et al., "Control and Quality-of-Service Provisioning in High-Speed Microcellular Networks" IEEE Personal Communications, Second Quarter 1994, pp. 34-43.
Non-Final Office Action received for U.S. Appl. No. 15/376,137 dated Mar. 23, 2018, 38 pages.
International Search Report and Written Opinion received for PCT Application No. PCT/US2017/052578, dated Jan. 22, 2018, 20 pages.
Non-Final Office Action received for U.S. Appl. No. 15/432,515 dated Mar. 30, 2018, 48 pages.
Non-Final Office Action received for U.S. Appl. No. 15/376,377 dated Apr. 5, 2018, 43 pages.
Non-Final Office Action received for U.S. Appl. No. 15/340,744 dated Apr. 26, 2018, 51 pages.
Non-Final Office Action received for U.S. Appl. No. 15/376,209 dated May 1, 2018, 68 pages.
Non-Final Office Action received for U.S. Appl. No. 15/445,760 dated Apr. 30, 2018, 47 pages.
Notice of Allowance received for U.S. Appl. No. 15/445,760 dated Sep. 24, 2018, 29 pages.
Final Office Action received for U.S. Appl. No. 15/340,744 dated Nov. 28, 2018, 38 pages.
Final Office Action received for U.S. Appl. No. 15/432,515 dated Oct. 29, 2018, 43 pages.
Final Office Action received for U.S. Appl. No. 15/376,209 dated Dec. 10, 2018, 37 pages.
Non-Final Office Action received for U.S. Appl. No. 16/871,566 dated Feb. 3, 2021, 65 pages.
Office Action received for Chinese Patent Application Serial No. 201780068599.4 dated Dec. 23, 2020, 10 pages.
Office Action received for Chinese Patent Application Serial No. 201780068600.3 dated Jan. 27, 2021, 8 pages.
Notice of Reasons for Refusal received for Japanese Patent Application Serial No. 2019517275 dated Dec. 25, 2020, 8 pages.

(56) References Cited

OTHER PUBLICATIONS

Communication Pursuant to Rules 94(3) EPC received for EP Patent Application Serial No. 17778093.9 dated Sep. 29, 2020, 08 pages.
Notification of Reason for Refusal received for Korean Patent Application Serial No. 10-2019-7009057 dated Aug. 28, 2020, 10 pages (Including English Translation).
Qualcomm Incorporated, "Discussion on advanced CSI reporting and initial evaluation results", R-166274 3GPP TSG-RAN WG1 #86, Aug. 22-26, 2016, 06 pages.
Notification of Reason for Refusal received for Korean Patent Application Serial No. 10-20197009054 dated Nov. 13, 2020, 5 pages (Including English Translation).
First Office Action received for Chinese Patent Application Serial No. 201780068606.0 dated Nov. 12, 2020, 7 pages.
Indian Office Action for Indian Application Serial No. 201947011929 dated Sep. 22, 2020, 8 pages.
Notice of Allowance received for U.S. Appl. No. 16/238,067 dated Feb. 6, 2020, 22 pages.
Communication pursuant to Article 94(3) EPC received for EP Patent Application Serial No. 17778094.7 dated Jan. 30, 2020, 04 pages.
Communication pursuant to Article 94(3) EPC received for EP Patent Application Serial No. 17778093.9 dated Feb. 12, 2020, 10 pages.
Notice of Allowance received for U.S. Appl. No. 15/376,209 dated Nov. 14, 2019, 40 pages.
AT & T and "Initial Access and Mobility Requirementsfor NR" and 3GPP TSG-RAN WG1#86b R1-1609387, the Internet<URL:http://www.3gpp.org/ftp/tsg_ran/WG1_RL1/TSGR1_86 b/Docs/R1-1609387.zip>, Oct. 1, 2016, 6 Pages.
Examination Report received for Indian application No. 201947011936 dated Apr. 8, 2021, 6 pages.
Communication pursuant to Article 94(3) EPC received for EP Patent Application Serial No. 17778092.1 dated May 10, 2021, 10 pages.
Second Office Action received for Chinese Patent Application Serial No. 201780068606.0 dated May 12, 2021, 13 pages.(Including English Translation).
Notification of Final Rejection received for Korean Patent Application Serial No. 10-2019-7009057 dated Apr. 20, 2021, 7 pages (Including English Translation).
Qualcomm Incorporated,"discussion on advanced CSI reporting and initial evaluation results", 3GPP TSG RAN WG1 #86, R1-166274, Aug. 13, 2016, 6 pages.
Etri., "potential CSI-RS and CSI feedback enhancements for EBF FD-MIMO", 3GPP TSG RAN WG1 #79, 3GPP server publication, R1-144923, Nov. 8, 2014, 6 Pages.
Communication pursuant to Article 94(3) EPC received for EP Patent Application Serial No. 17778093.9 dated May 18, 2021, 10 pages.

Grant of Patent Received for Korean application No. 10-2019-7009054 dated May 27, 2021, 4 pages(Including English Translation).
Nokia, Alcatel-Lucent Shanghai Bell., "On System Design for Multiple Numerologies—Initial Access", 3GPP R1-167258, R1-167258, 6 pages.
Notice of Reasons for Refusal received for Japanese application No. 2019-517294 dated Apr. 22, 2021, 14 pages (Including English Translation).
ZTE, "Discussion on Feedback Scheme for Reduced Dimension Channel", 3 GPP TSG-RANWG1#80b Apr. 11, 2015 R1-151743, 6 pages.
ZTE., "Discussion on CSI-RS and CSI enhancement for EBF/FD-MIMO", 3GPP TSG-RAN WG1#81 R1 May 16, 2015, R1-152985, 8 pages.
AT & T., "Generic CSI feedback framework for NRMIMO", 3GPPTSG-RANWG1#86b, Oct. 1, 2016, R1-1609388, 7 pages.
Notice of Reasons for Refusal received for Japanese application No. 2019-517317 dated May 27, 2021, 6 pages (Including English Translation).
NTT DOCOMO., "RAN WG's progress on NR technology SI in the May meeting", 3GPP TSG-RAN WG2 #95, R2-164707, 9 pages.
Notification of Preliminary Rejection received for Korean Patent Application Serial No. 10-2019-7009057 dated Jul. 16, 2021, 7 pages (Including English Translation).
ZTE Corporation et al., R1-164297, Consideration on CSI measurement and feedback for NR MIMO, 3GPP TSG RAN NG1 #85, 3GPP (May 14, 2016) 4 pages.
Notice of Reasons for Refusal received for Japanese application No. 2019-517275 dated Jan. 5, 2021, 8 pages Including English Translation).
Office Action dated Jul. 5, 2021 for Chinese Application No. 201780068599.4, 11 pages (with English Summary).
Huawei et al., R1-167197, CSI acquisition mechanism for NR DL MIMO, 3GPP TSG RAN WG1 #86, 3GPP (Aug. 12, 2016) 9 pages.
Non-Final Office Action received for U.S. Appl. No. 16/830,367 dated Oct. 29, 2021, 119 pages.
Third Office Action received for Chinese Patent Application Serial No. 201780068599.4 dated Oct. 9, 2021, 7 pages (Including English Translation).
Decision to Grant Patent received for Japanese Patent Application Serial No. 2019-517294 dated Oct. 19, 2021, 6 pages (Including English Translation).
Decision to Grant received for European Patent Application Serial No. 17778094.7 dated Nov. 11, 2021, 2 pages.
Third Office Action received for Chinese Patent Application Serial No. 201780068606.0 dated Sep. 13, 2021, 8 pages.(lncluding English Translation).
Decision to Grant received for Japanese Patent Application Serial No. 2019517317 dated Sep. 30, 2021, 6 pages (Including English Translation).

* cited by examiner

FACILITATING UPLINK COMMUNICATION WAVEFORM SELECTION

CROSS-REFERENCE TO RELATED APPLICATIONS

The subject patent application is a continuation of, and claims priority to, U.S. patent application Ser. No. 15/376,209, filed Dec. 12, 2016, and entitled "FACILITATING UPLINK COMMUNICATION WAVEFORM SELECTION," each of which patent applications claim the benefit of priority to U.S. Provisional Patent Application No. 62/401,872, filed Sep. 29, 2016 and titled "NETWORK ASSISTED WAVEFORM SELECTION FOR WIRELESS COMMUNICATION SYSTEMS," the entireties of which applications are hereby incorporated herein by reference.

TECHNICAL FIELD

The disclosed subject matter relates to facilitating uplink communication waveform selection in wireless communication systems, and more particularly fifth generation (5G) wireless communication systems or other next generation wireless networks.

BACKGROUND

To meet the huge demand for data centric applications, Third Generation Partnership Project (3GPP) systems and systems that employ one or more aspects of the specifications of fourth generation (4G) standard for wireless communications will be extended to a fifth generation (5G) standard for wireless communications. 5G wireless communication networks are currently being developed and expected to handle a very wide range of use cases and requirements, including among others mobile broadband (MBB) and machine type communications (MTCs). For mobile broadband, 5G wireless communication networks are expected to fulfill the demand of exponentially increasing data traffic and to allow people and machines to enjoy gigabit data rates with virtually zero latency. Compared to existing 4G technologies, such as long-term evolution (LTE) networks and advanced LTE networks, 5G is targeting much higher throughput with low latency and utilizing higher carrier frequencies and wider bandwidths, at the same time reducing energy consumption and costs. Unique challenges exist to provide levels of service associated with forthcoming 5G standards, or other next generation networks.

DETAILED DESCRIPTION

Figure 1:
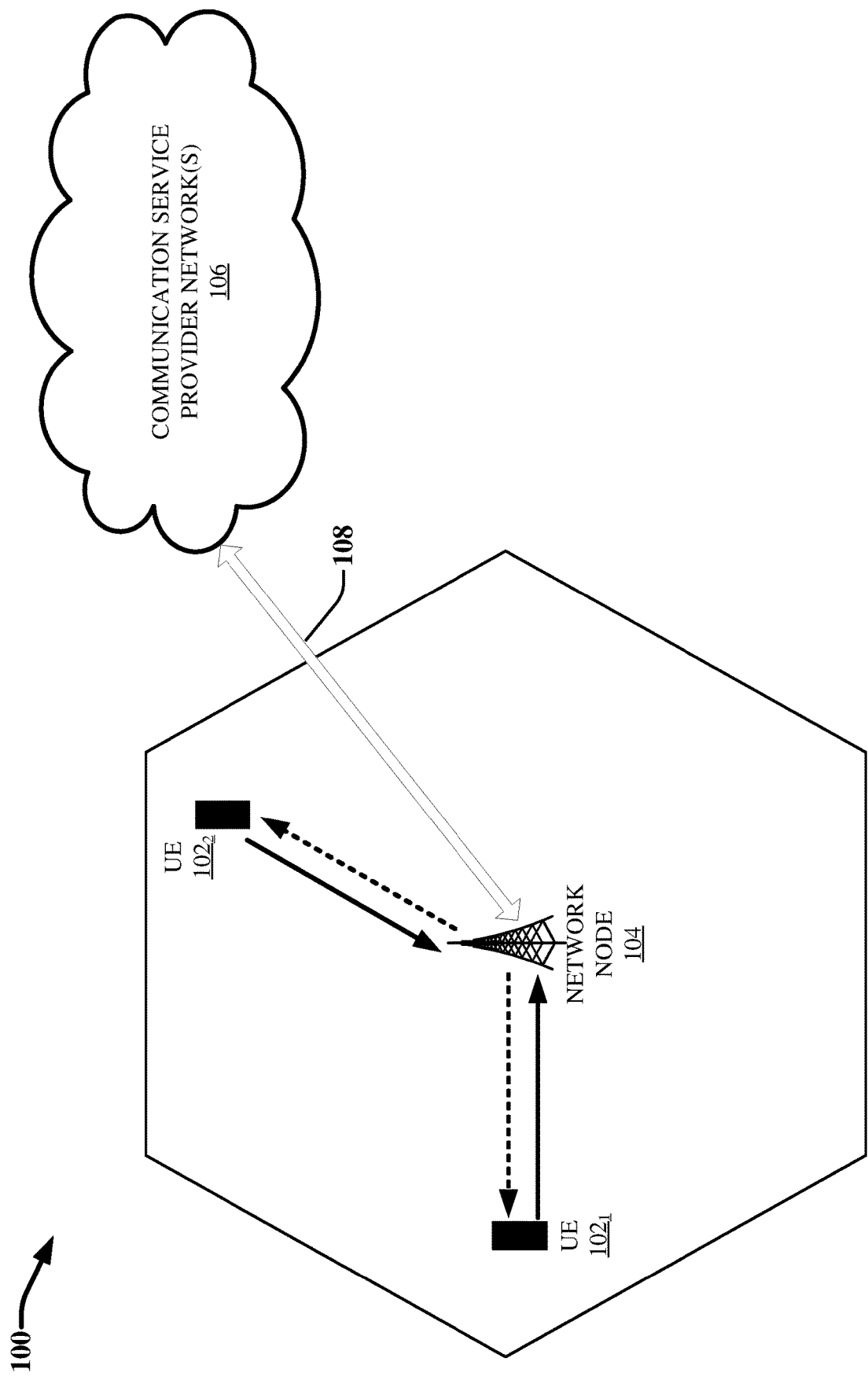
FIG. 1 is an illustration of an example wireless communication system that facilitates waveform selection for user equipment (UE) uplink communications in accordance with various aspects and embodiments of the subject disclosure.

The selection of the radio waveform or modulation scheme plays an important role in the design of 5G wireless communication systems due to its impact on transceiver design, complexity and the radio numerology. The waveforms used in 5G wireless communication system should be able to satisfy various 5G requirements, such as high spectral efficiency (at least for sub-millimeter-wave frequencies), low latency and limited complexity. Several waveforms are being researched as potential candidates for the 5G air interface, each having different advantages and drawbacks with respect to various design parameters, such as but not limited to: peak-to-average-power ratio, out-of-band leakage, bit-error-rate (BER) in multipath, complexity (at the transmitter and the receiver), multi-user support, multiple input, multiple output (MIMO) support, latency, asynchronicity, and the like. Orthogonal frequency division multiplexing (OFDN) and discrete Fourier transform (DFT)-spread (precoded) OFDM (also known as single carrier frequency division multiplexing (SC-FDMA)), as well as filter bank multicarrier (FBMC), have been most widely considered. Both OFDM and FBMC are well-known multicarrier techniques where data symbols are transmitted simultaneously over multiple frequency subcarriers. The main difference between OFDM and FBMC relates to the pulse shaping applied at each subcarrier. OFDM uses a simple square window in the time domain allowing a very efficient implementation, whereas in FBMC the pulse shaping at each subcarrier is designed in a specific way, (e.g., by utilizing prototype functions with concentrated frequency localization such that the out-of-band (OOB) emissions of the waveform become negligible). The zero-tail DFT spread OFDM (ZT DFT-s-OFDM) waveform has been proposed as a further enhancement of the DFT-s-OFDM waveform. The generalized frequency division multiplexing (GFDM) waveform has also been considered which employs a unique cyclic prefix (CP) for large sets of symbols, thus reducing the system overhead. Universal filtered multicarrier (UFMC) provides an intermediate solution between OFDM and FBMC by performing the filtering operations on a frequency block basis rather than per subcarrier. Other waveform candidates include but are not limited to unique-word (UW) DFT-Spread-OFDM, UW-OFDM, CP-OFDM, resource-block-filtered OFDM, and universal filter multi-carrier (UFMC).

The selection of the radio waveform or modulation further has an impact on numerology design. Numerology refers to a waveform's configuration with respect to the possible values of the waveform parameters. For example, with respect to OFDM and related waveforms, numerology refers to the waveform configuration in terms of sub-carrier spacing, symbol duration, cyclic prefix, resource block size, transmission time interval (TTI) length, etc. In addition to the various potential waveforms, 5G supports multiple numerologies for the different waveforms. An optimized radio numerology has a fundamental importance in the system design since it ensures an efficient usage of the radio resources, while coping with the design requirements. In that respect, the numerology design is depending on the carrier frequency as well as the propagation characteristics of the environment, where the system is intended to operate.

Furthermore, with respect to waveforms or modulations that employ multiple sub-bands or sub-carriers where data symbols are transmitted simultaneously over multiple frequency subcarriers (e.g., OFDM, CP-OFDM, DFT-spread OFMD, UFMC, FMBC, etc.), 5G provides for different numerologies within a single waveform type, wherein the respective sub-bands or sub-carriers can have different numerologies. For example, with conventional OFDM, CP-OFDM, and related signal modulation schemes, a unified numerology can be applied across the entire bandwidth, meaning the entire bandwidth is configured with the same waveform parameters, (i.e., the subcarrier spacing, CP length and TTI length). Each sub-band is thus filtered with a same frequency domain filter, referred to herein as a wideband filter or a wideband filtering scheme. In some implementations, each sub-band can be filtered with a same time domain filter, a filtering technique referred to as time domain windowing. However, in various adaptations of these waveform types, the sub-bands can be filtered independently. As result, each sub-band can be configured with different waveform parameters or numerologies. Waveform configurations in which sub-bands are filtered independently with different numerologies are referred to herein as sub-band filtered configurations or sub-band filtering schemes.

The subject disclosure is directed to computer processing systems, computer-implemented methods, apparatus and/or computer program products that facilitate selection of the radio frequency (RF) uplink signaling waveform design for application by a UE. In various embodiments, the waveform selection can be performed by the network and the network can instruct respective UEs serviced by the network (e.g., by a physical (PHY) layer network node) to apply a particular waveform configuration based on current network conditions. This scenario is referred to herein as network assisted waveform selection. In some additional embodiments, the UEs can autonomously determine what waveform to apply based on the current network conditions. This scenario is referred to herein as UE based waveform selection. In various embodiments, the network conditions can relate to, (but are not limited to), one or more of the following: scheduling constraints of the network node (e.g., including physical resource block (PRB) assignments, spatial layer assignments, etc.), current traffic conditions (e.g., the current amount of traffic and associated load of the network node, the type of traffic scheduled for the UEs, etc.), relative locations of the UEs, UE capabilities with respect to generating different types of traffic, current signal to noise ratio (SNR) experienced by a UE, current signal to interference plus noise ratio (SINR) experienced by a UE, and the like.

For example, in accordance with network assisted waveform selection, UEs included in a wireless communication network can respectively establish communication links with a network device (e.g., a NodeB device, an eNodeB device, and access point devices, etc.) configured to facilitate wireless communications of the respective UEs. The UEs and the network device can further be configured to employ a multi-carrier waveform scheme that provides for wideband filtering, time domain window filtering, and sub-band filtering (e.g., OFDM, CP-OFDM, DFT-spread OFMD, UFMC, FMBC, etc.). The network node/device can further determine a particular waveform filtering scheme for the respective UEs to apply on uplink transmissions based on one or more current network conditions associated with facilitating wireless communications of the UEs. In one or more implementations, the waveform filtering schemed can include wideband filtering, time domain window filtering, or sub-band filtering. The network node/device can further direct the respective UEs to apply the waveform filtering scheme selected for each UE. For example, after the network node/device selects a particular waveform filtering scheme for a UE, the network node/device can send the UE a waveform assignment message with information identifying the particular waveform that the UE should apply. In some implementations, the waveform assignment message can be provided using a single bit in the control channel. For example, a first bit value included in a message sent via the control channel can indicated the UE should apply wideband filtering and a second bit value can indicate the UE should apply sub-band filtering (or vice versa). The UE can further be configured to interpret the waveform assignment message and apply the directed waveform when configuring and transmitting RF signals.

In some embodiments, the network node/device can dynamically direct UEs to apply particular waveform filtering schemes based on current network conditions. For example, the network can direct a UE to apply a first filtering scheme and later direct the UE to use a different filtering scheme based on a change in network conditions (e.g., decreased traffic, reduced scheduling constraints, etc.). For example, based on a decrease in traffic, the network node/device may determine that it is not necessary for a UE to continue employing a sub-band filtering scheme. For instance, the network node/device may determine that the UE should stop applying the sub-band filtering scheme as previously directed and apply a wideband filtering scheme to minimize the inference leakage to the adjacent wireless systems. According to these embodiments, the network device can be configured to send the UE an updated waveform assignment message directing the UE to apply the different filtering scheme. This updated waveform assignment message may be transmitted in the control channel or via a different signaling layer.

In accordance with UE based waveform selection, the UE can autonomously determine what waveform filtering scheme to apply to uplink communications based on one or more current network conditions. For example, in association with establishing a wireless connection with a network node, the UE can receive (from the network node to which it has established a connection) or determine, information regarding but not limited to: scheduling information for the UE (e.g., PRB assignments, spatial layer assignments, assigned modulation and coding scheme (MCS), etc.), current traffic conditions (e.g., the current amount of traffic and associated load of the network node, the type of traffic scheduled for the UEs, etc.), relative locations of the UE to other UEs, UE capabilities with respect to generating different types of traffic, current SNR experienced by the UE, current SINR experienced by the UE, and the like. Based on the current network conditions, the UE can be configured to select either wideband filtering, time domain windowing filtering, or sub-band filtering. The UE can then configure uplink communications according to the selected filtering scheme.

In one or more additional embodiments, in association with wireless communication systems that employ one or more waveform types that use a single numerology applied to the entire bandwidth (i.e., the entire bandwidth is configured with same waveform parameters, such as with wideband OFDM and the like), the network and/or the one or more network devices can dynamically determine the waveform numerology for the UE to apply (i.e., waveform parameter values) based on the current traffic and/or scheduling conditions. The network and/or the one or more network devices can further provide the UE with a waveform assignment message with information identifying the particular waveform parameters to apply. The UE can further be configured to interpret the waveform assignment message and apply the directed waveform parameters when configuring and transmitting RF signals and decoding received RF signals. Still in yet various additional embodiments in which the wireless communication system employs various different waveform types to facilitate communication between UEs and network devices, the network and/or the one or more network devices can determine, based on the current traffic and/or scheduling conditions, what waveform type (and in some implementations waveform type and numerology) for the UE to employ. The network and/or the one or more network devices can further provide the UE with a waveform assignment message with information identifying the particular waveform type (and in some implementations the type and numerology) to employ. The UE can further be configured to interpret the waveform assignment message and apply the directed waveform type (and numerology) when configuring and transmitting RF signals and decoding received RF signals.

In one or more embodiments, a system is provided comprising a processor and a memory that stores executable instructions that, when executed by the processor, facilitate performance of operations. These operations can comprise facilitating establishing a wireless communication link between a first device and a second network device of a wireless communication network, and determining a waveform filtering protocol for application by the first device in association with performance of uplink data transmissions from the first device to the second network device. In various implementations, the operations further comprise sending a waveform assignment message to the first device via the second network device, the waveform assignment message comprising information that directs the first device to employ the waveform filtering protocol for the uplink data transmission, and wherein based on the sending, the first device is configured to apply the waveform filtering protocol.

In another embodiment, a method is disclosed that comprises determining, by a device comprising a processor, network conditions associated with performing wireless communications with a network device of a wireless communication network, and determining, by the device based on the network conditions, a waveform filtering protocol for application by the device in association with transmitting data to the network device. In one or more implementations, the method further comprises, transmitting, by the device, the data to the network device using the waveform filtering protocol. In an aspect, the network conditions comprise a signal to noise and interference ratio detected by the device. In various embodiments, the determining the waveform filtering protocol comprises selecting a sub-band filtered waveform based on the network conditions indicating a first traffic environment and selecting a wide-band filtered waveform based on the network conditions indicating a second traffic environment.

In yet another embodiment, a machine-readable storage medium, comprising executable instructions that, when executed by a processor, facilitate performance of operations. These operations can comprise facilitating establishing a wireless communication link between a first device and a second network device of a wireless communication network, and determining a waveform filtering scheme for usage by the first device for transmitting uplink data to the second network device by the first device.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is an illustration of an example wireless communication system 100 that facilitates waveform selection for UE uplink communications in accordance with various aspects and embodiments of the subject disclosure. System 100 can comprise one or more user equipment UEs 102. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. In various embodiments, system 100 is or includes a wireless communication network serviced by one or more wireless communication network providers. In the embodiment shown, a UE 102 can be communicatively coupled to the wireless communication network via a network node 104. The non-limiting term network node (or radio network node) is used herein to refer to any type of network node serving a UE 102 and/or connected to other network node, network element, or another network node from which the UE 102 can receive a radio signal. Examples of network nodes (e.g., network node 104) can include but are not limited to: NodeB devices, base station (BS) devices, access point (AP) devices, and radio access network (RAN) devices. The network node 104 can also include multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission nodes, an RRU, an RRH, nodes in distributed antenna system (DAS), and the like. In the embodiment shown, the UE 102 can send and/or receive communication data via a wireless link to the network node 104. The dashed arrow lines from the network node 104 to the UE 102 represent downlink communications and the solid arrow lines from the UE 102 to the network nodes 104 represents and uplink communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can include wired link components, such as but not limited to: like a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular technologies and modulation schemes to facilitate wireless radio communications between devices (e.g., the UE 102 and the network node 104). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). With these waveform signaling technologies, each sub-band can be configured with different waveform parameters or numerologies.

In particular, in various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks. Thus in various embodiments, the devices of system 100 (e.g., UE 102, network node 104, etc.) can be configured to employ one or more multi-carrier modulation schemes wherein the sub-bands can be configured with mixed numerology, including but not limited to OFDM, CP-OFDM, DFT-spread OFMD, UFMC, FMBC, and the like.

However, various multi-carrier schemes that employ different numerologies in sub-bands are not devoid drawbacks. For example, when sub-carriers with different numerologies are transmitted within a multi-carrier waveform that employs signal orthogonality to mitigate interference (e.g., OFDM and the like), the orthogonality between the sub carriers can be lost and interference from adjacent carriers can be leaked to the other sub-bands. As a result, the network cannot schedule multiple UEs with multiple numerologies and the network capacity is lost significantly.

In order to mitigate this problem, in various embodiment, the devices of system 100 (e.g., UE 102, network node 104, etc.) can be configured to employ sub-band filtering techniques in association with configuring signal waveforms. With sub-band filtering, the system bandwidth is divided into the multiple sub-bands and into sub-bands and different waveform parameters for the different sub-bands are set according to the actual traffic scenario. Each sub-band is further filtered independently to maintain orthogonality amongst the sub-bands when the respective sub-bands have different or mixed numerology. Through the filter configuration, each sub-band can achieve its own configuration, and the combined 5G waveforms would supports dynamic soft parameters configuration for air-interface according the traffic types. In various embodiments, an OFDM waveform that employs sub-band filtering with different sub-bands of mixed numerology is referred to herein as a filtered OFDM waveform (F-OFDM).

Figure 2:
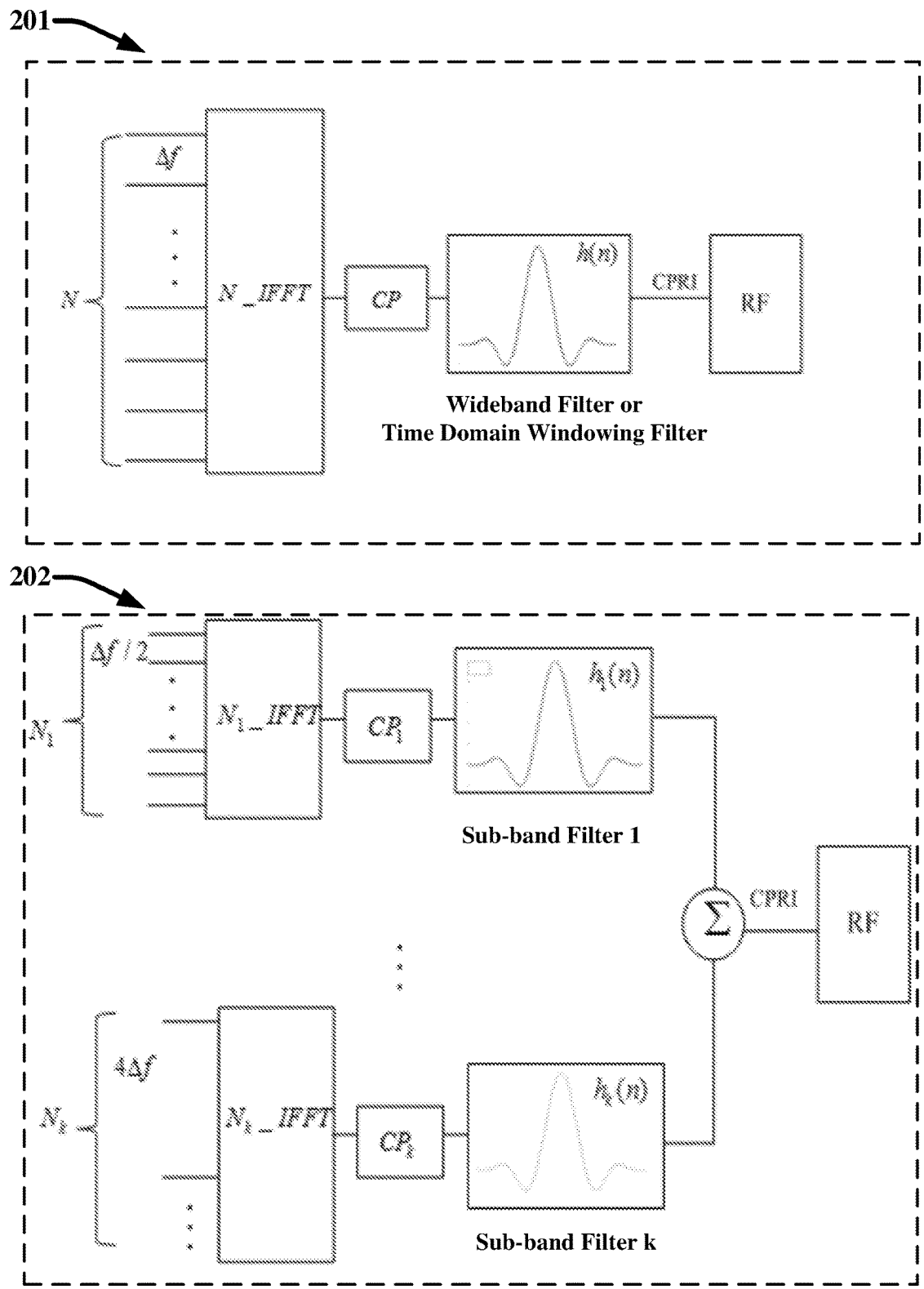
FIG. 2 presents diagrams illustrating orthogonal frequency division multiplexing (OFDM) and filtered OFDM (F-OFDM) in accordance with various aspects and embodiments of the subject disclosure.

FIG. 2 presents diagrams illustrating OFDM and F-OFDM in accordance with various aspects and embodiments of the subject disclosure. Diagram 201 demonstrates an OFDM waveform wherein wideband filtering or time domain window filtering is employed. As previously described, with wideband filtering and time domain window filtering, a same filter h(n) is applied to each of the respective sub-bands. Diagram 202 demonstrates a F-OFDM waveform wherein sub-band filtering is employed. As shown in diagram 202, each of the sub-bands $N_1$-$N_k$ are assigned a separate filter 1-k respectively.

With reference back to FIG. 1, as discussed above, multi-carrier waveforms that split the system bandwidth into different sub-bands and apply different or mixed numerology to the respective sub-bands can accommodate different types of services leading to improved spectrum utilization. Further usage of sub-band filtering minimizes the interference spread to the adjacent subcarriers of the different numerology, thus facilitating multiple numerology deployment. However, depending on the traffic and scheduling conditions of the system 100, it may not be necessary or advantages for UEs to employ a waveform scheme with mixed numerology sub-bands and sub-band filtering schemes. In these scenarios, wideband filtered waveforms or time domain window filtering schemes, which minimize the inference leakage to the adjacent wireless systems, may be more suitable.

Thus in various embodiments, the respective UEs 102 (and other devices of system 100) can be configured to employ different filtering schemes depending on current network conditions. The network conditions can relate to, (but are not limited to), one or more of the following: scheduling constraints of the network node 104 in association with scheduling a plurality of UEs (e.g., UEs 102) serviced by the network node 104 (e.g., including PRB assignments, spatial layer assignments, MSC assignments, etc.), current traffic conditions (e.g., the current amount of traffic and associated load of the network node 104, the type of traffic scheduled for the UEs, priority constraints associated with different types of traffic and UEs, etc.), relative locations of the UEs 102 to one another and the network node 104, UE capabilities with respect to generating different types of traffic, current SNR experienced by a UE, current signal to interference plus noise ratio SINR experienced by a UE, and the like. The filtering schemes can include wideband filtering schemes and/or time domain window filtering schemes and sub-band filtering schemes (with sub-carriers having different numerology) in association with usage of one or more multi-carrier waveforms. For example, in one embodiment, these waveforms can include OFDM waveforms and F-OFDM waveforms. Other suitable waveforms can include but are not limited to: CP-OFDM, DFT-spread OFMD, UFMC, and FMBC. In other implementations, devices of system 100 can employ any multi-carrier modulation that can use sub-band filtering to maintain orthogonality in a mixed numerology scenario, in addition to wideband filtering and/or time domain window filtering.

In some embodiments, the waveform selection can be performed by the network node 104 or a higher layer network device (e.g., a core network device), a scenario referred to herein as network assisted waveform selection. In one or more additional embodiments, the UEs can autonomously determine what waveform to apply based on the current network conditions, a scenario is referred to herein as UE based waveform selection.

In one implementation of network assisted waveform selections, the UEs 102 can establish wireless connection links with the network node 104. The network node 104 (or another higher layer network device responsible for facilitating wireless communications) can be configured to monitor and evaluate network conditions that effect various network service requirements (e.g., 5G network service requirements) of the wireless communication in association with facilitating wireless communications by the UEs. As noted above, these network conditions can include for example, traffic conditions associated with facilitating wireless communications of the UEs 102 via the network node 104. These traffic conditions can relate to an amount of traffic and/or a distribution of the type of traffic. The network conditions can also include scheduling constraints associated with scheduling the plurality of UEs service by the network node 104 to different sub-bands, spatial layers, time slots, etc. The network conditions can also include relative distances of the scheduled UEs 102 to one another. The network node 104 (or another suitable network device) can further determine a suitable waveform for application by the respective UEs 102 on uplink data transmissions based on the current network conditions (e.g., traffic conditions, scheduling constraints, relative UE locations, etc.). In particular, in one or more embodiments, the network node 104 (or another suitable connected network device) can select a sub-band filtered waveform or a wideband filtered waveform. In another example, the network node 104 can select a sub-band filtered waveform, a wideband filtered waveform or a time domain window waveform.

In some embodiments, the network node 104 can employ a threshold based analysis wherein predefined threshold values are set with respect to network condition parameters, including traffic amount, traffic type distribution, PRB scheduling separation, spatial layer scheduling, MCS assignments, distances between UEs, and the like, and application of either wideband filtering, time windowing filtering, or sub-band filtering. According to these embodiments, based on a determination that current network conditions indicate one or more network condition parameters are above or below the threshold value, the network can direct a UE to apply either wideband filtering, time domain windowing filtering, or sub-band filtering.

For example, the network node 104 can be configured to direct a UE 102 to apply sub-band filtering if the current traffic levels are relatively high (e.g., above a threshold traffic level value) and apply wide-band filtering or time domain windowing filtering if the current traffic levels are relatively low (e.g., below the threshold traffic level value). In another example, the network node 104 can be configured to direct a UE 102 to apply sub-band filtering if the average current traffic type distribution is associated with relatively high bandwidth and/or priority requirements (e.g., above a threshold bandwidth level or priority level), and apply wide-band filtering or time domain windowing filtering if the average current traffic type distribution is associated with relatively low bandwidth and/or priority requirements (e.g., below the threshold traffic level value).

In another example, the network node 104 can be configured to direct the respective UEs 102 to apply sub-band filtering if data communications for the respective UEs 102 are scheduled to relatively close PRBs (e.g., within a threshold degree of separation), and apply wide-band filtering or time domain windowing filtering if respective UEs 102 are scheduled to relatively far PRBs (e.g., outside the threshold degree of separation. For example, in one embodiment, if the difference between the scheduling blocks for UE $102_1$ and UE $102_2$ is less than N resource blocks (e.g., 3 resource blocks), then the network node 104 can recommend the UEs use wideband filtering. However if the difference is greater than or equal to N resource blocks (e.g., 3 or more resource blocks) the network node 104 can recommend the UE's use sub-band filtering. For example, consider the scenario, wherein the network node 104 schedules respective UEs $102_1$ and $102_2$ with different numerologies to PRBs that are adjacent to each other within the OFDM bandwidth. By applying sub-band filtering at the UE, the performance can be improved as there is less leakage to adjacent sub-carriers. However, if the respective UEs $102_1$ and $102_2$ are scheduled far apart in PRB locations (e.g., three or more blocks apart) then there is little or no benefit in applying sub-band filtering. In this case, the UEs 102 can be directed to employ wideband filtering or time domain windowing filtering to limit possible leakages that may impact systems adjacent to the OFDM carrier.

In yet another example, the network node 104 can be configured to direct the UEs 102 to apply sub-band filtering if the respective UEs 102 are separated by a distance greater than or equal to a threshold distance and apply wide-band filtering or time domain if the respective UEs 102 are separated by a distance less than the threshold distance. For example, if the respective UEs are separated by a significant distance (e.g., UE $102_1$ is located near the cell edge and UE $102_2$ is located near the cell center), and the respective UEs are asynchronous, orthogonality is lost even if they use same numerology. Accordingly, by using sub-band filtering, the loss is minimized.

It should be appreciated that a combination of different network conditions can effect whether sub-band filtering, wide-band filtering, or time domain windowing filtering is appropriated. Accordingly, in various embodiments, the network node 104 (or a higher layer network device) can be configured to employ one or more algorithms that relate sub-band filtering and wideband filtering or time domain windowing filtering to a combination of values for different measured network conditional parameters (e.g., traffic related parameters, scheduling related parameters, UE separation distance, SNR, SINR, etc.).

In accordance with the subject network assisted waveform selection techniques, after the network node 104 (or higher layer network device) has chosen the appropriate waveforms for the respective UEs 102, the network node 104 can then direct the respective UEs 102 to apply the selected waveform on uplink data transmissions. For example, in one embodiment the network node 104 can send the respective UEs 102 a waveform assignment message. The waveform assignment message can include waveform configuration data identifying a type of waveform for application by the UE 102. In some embodiments, the waveform configuration data can be included in the control channel associated with the wireless communication link between the UE 102 and the network node 104. For example, the waveform assignment message can be in the form of a sing data byte, wherein a first value (e.g., zero) indicates the UE should employ a wideband filtering scheme and wherein a second value (e.g., one) indicates the UE should employ a sub-band filtering schemed. The UEs can further be configured to interpret waveform assignment messages and apply the corresponding waveforms as directed.

In some implementations, in association with assignment of a sub-band filtered waveform, the waveform assignment message can further define the filters to apply to the respective sub-bands and/or the respective numerologies of the respective sub-bands. In an implementation in which a wideband filtered waveform is assigned, the waveform assignment message can also include information identifying the numerology to apply to the waveform. The UE 102 can further be configured to interpret the waveform assignment message and apply the directed waveform when configuring and transmitting uplink data transmissions to the network node 104.

The signaling layer protocol used to send the waveform assignment messages can vary. For example, the waveform assignment message can be sent by the network node 104 dynamically using physical (PHY) layer signaling (e.g., using the control channel), or it can be sent using higher layer signaling (e.g., using a radio resource control (RRC) message). In cellular communication systems, the signaling layer protocol refers to the protocol associated with the respective layers of the Open System Interconnection (OSI) model. In order from the lowest layer to the highest layer, these layers include the following seven layers: the PHY layer or layer 1, the data link layer or layer 2, the network layer or layer 3, the transport layer or layer 4, the session layer or layer 5, the presentation layer or layer 6, and the application layer or layer 7. In some implementations, the network node 104 can be configured to employ a low layer (e.g., a PHY layer) signaling protocol to send a waveform assignment message to a UE. In other implementations, the network node 104 (or a higher layer network device) can be configured to employ a higher layer (e.g., the network layer or layer 3) signaling protocol to send the waveform assignment message. For example, the higher layer signaling protocol can include a radio resource control (RRC) message. With RRC signaling, the signaling parameters do not change so these signals may be signaled through higher layer signaling.

In some embodiments, the network node 104 can direct UEs that remain attached to the network node 104 to change their waveform filtering schemes based on one or more changes in network conditions (e.g., decreased traffic, reduced scheduling constraints, UE location etc.). For example, based on a decrease in traffic serviced by the network node 104, it may not be necessary for a UE to continue employing a sub-band filtering scheme (e.g., to minimize the inference leakage to the adjacent wireless systems). In another example, based on new scheduling constraints associated with increased UEs and network load, the network node 104 can determine that one or more UEs attached thereto should switch from employing a wideband filtering scheme to a sub-band filtering scheme (e.g., to accommodate different type of services in sub-bands with different numerology, leading to an improved spectrum utilization, while minimizing the interference spread to the adjacent subcarriers of the different numerology). According to these embodiments, the network node 104 can be configured to send the UE 102 an updated waveform assignment message directing the UE to apply the different filtering scheme.

This updated waveform assignment message may be transmitted using the same signaling layer protocol as the initial waveform assignment message or using a different signaling layer protocol. In particular, the network node 104 (or a higher layer network device) can employ a first signaling layer protocol to send the initial waveform assignment message and a different second signaling layer protocol to send the updated waveform assignment message to reduce the signaling overhead or to reduce the delay in applying the decision. The first signaling layer protocol can be a lower layer protocol than the second signaling layer protocol, or vice versa. For example, in some implementations, the initial waveform assignment message can be transmitted using the control channel and the updated waveform assignment message can be transmitted using an RRC message, or vice versa.

With the subject network assisted waveform selection techniques, the wireless communication network can minimize or avoid interference leakages to the other sub carriers while facilitating multiple numerology deployment, thereby improving the capacity of 5G systems. With the proposed method, the UEs 102 can also benefit by avoiding the sharp filter implementation, thereby facilitating low complexity implementations of the UEs. For example, in one example implementation of system 100, $U_{E1}$ and $U_{E2}$ with different numerologies may be scheduled adjacent to each other within the OFDM bandwidth. By applying sub-band filtering at the UE, network performance can be improved as there is less leakage to adjacent sub-carriers. However, say if for example $U_{E1}$ and $U_{E2}$ are scheduled far apart in sub carrier locations, then the network node 104 may determine the is little or no network gain associated with having the UEs apply sub-band filtering. Hence, in this case, the network node 104 can direct the respective UEs to use wideband filtering or time domain window filtering to limit potential leakages to adjacent OFDM carriers. Hence, the network node 104 (or another connected network device) can determine whether and when UEs attached thereto should employ sub-band filtering, wide-band filtering, or time domain window filtering.

In addition to network assisted waveform selection, in various additional embodiment, system 100 can facilitate UE based waveform selection. In accordance with UE based waveform selection, the UEs 102 can autonomously determine what waveform filtering scheme to apply to uplink communications based on one or more current network conditions. The UEs 102 can then configure and/or transmit uplink communications according to the selected filtering scheme. For example, in association with establishing a wireless connection with the network node 104, a UE 102 can receive (from the network node 104) or determine, information regarding network conditional parameters applicable to the UE, including but not limited to: PRB assignments for the UE, spatial layer assignments for the UE, MCS assignments for the UE, current traffic amount serviced by the network node 104, current traffic distribution service by the network node 104, distance between the UE to the network node 104, current SNR experienced by the UE, current SINR experienced by the UE, and the like. Based on the current network conditions, the UE can be configured to select either wideband filtering, time domain windowing filtering, or sub-band filtering for uplink communications using same or similar analysis techniques employed by the network node 104 (or the higher layer network device). For example, the UE can employ a threshold based analysis wherein predefined threshold values for one or more network conditional parameters are set by the network and provided to the UE. The UE can further choose to apply wideband filtering, time domain windowing filtering, or sub-band filtering based on measured or determined values for the one or more network parameters being above or below the threshold values.

For example, the UE $102_1$ can be configured to apply sub-band filtering in conditions involving high traffic volumes (e.g., relative to a threshold traffic value). In another example, the UE $102_1$ can be configured to employ sub-band filtering as opposed to wideband filtering when scheduled to PRB assignments that are separated from UE $102_2$ less than a threshold amount. In another example, the UE $102_1$ can be configured to employ sub-band filtering as opposed to wideband filtering when scheduled to spatial layer assignments that are greater than a threshold amount. In another example, the UE $102_1$ can be configured to employ sub-band filtering as opposed to wide-band filtering when scheduled to a particular MCS. In another example, the UE $102_1$ can be configured to employ sub-band filtering as opposed to wideband filtering based on being separated from the network node 104 by a distance greater than threshold distance. In another example, the UE $102_1$ can be configured to employ sub-band filtering as opposed to wideband filtering based on detection of relatively high SNR or SINR values. In particular, if the UE $102_1$ is in the low SINR region, it does not gain anything by sub-band filtering because it is dominated by the other cell interference, not by the mixed numerology. In another implementation, the UE can be configured to employ one or more algorithms that relate sub-band filtering and wideband filtering or time domain windowing filtering to a combination of values for different measured network conditional parameters (e.g., traffic related parameters, scheduling related parameters, UE separation distance, SNR, SINR, etc.).

Figure 3:
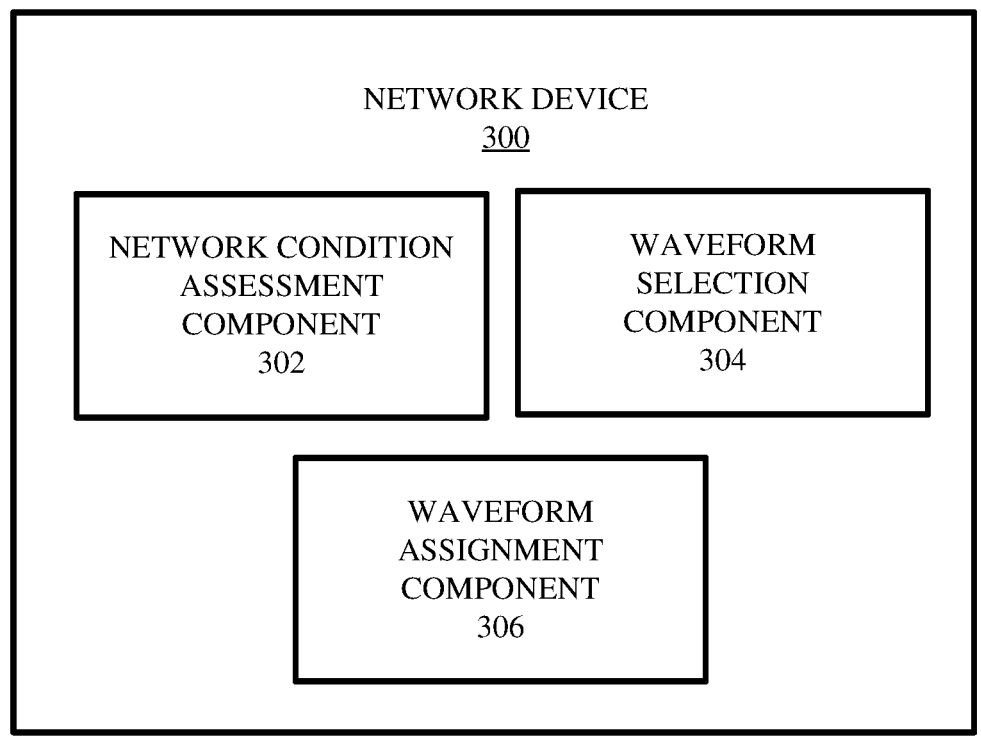
FIG. 3 is an illustration of an example network device that facilitates network assisted waveform selection for UE uplink communications in accordance with various aspects and embodiments of the subject disclosure.

FIG. 3 is an illustration of an example network device 300 that facilitates network assisted waveform selection for UE uplink communications in accordance with various aspects and embodiments of the subject disclosure. In various embodiments, the network node 104 of system 100 can be or include network device 300. In other embodiments, the network device 300 can be remote from the network node 104 yet included in a communication service provider network of the one or more communication service provider networks 106 and communicatively coupled to UEs (e.g., UE 102) to facilitate wireless communications by the UEs. Repetitive description of like elements employed in respective embodiments is omitted for sake of brevity.

Aspects of systems (e.g., system 100 and the like), apparatuses/devices (e.g., network device 300) or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity. Although not shown, the network device 300 can comprise a processor and a memory that stores executable instructions that, when executed by the processor, facilitate performance of operations. Examples of said processor and memory, as well as other suitable computer or computing-based elements that can be employed by the network device 300 to facilitate dynamic waveform selection, can be found with reference to FIG. 11, and can be used in connection with implementing one or more of the systems or components shown and described in connection with FIGS. 1, 2 or other figures disclosed herein.

In one or more embodiments, the network device 300 can be configured to facilitate wireless communications between various devices (e.g., UE 102 and other UEs and network devices) included in a wireless communication network (e.g., system 100). For example, the network device 300 can include a nodeB, a BS device, an AP device, a RAN device, a core wireless network device, etc. of the wireless communication network. In one or more embodiments, based on establishment a wireless connection link with the network device 300, a UE can communicate, via the network device 300, with various other devices included in the network. Depending on the UE device capabilities and the network capabilities (e.g., 5G capabilities vs. 4G capabilities), the type of wireless communications performed by the UE can vary. For example, the communication can involve enhanced mobile broadband (eMBB), MTC communications, massive MTC communications, and/or ultra-reliable low latency communications (URLLC). The types of traffic associated with the respective communications can further vary.

In one or more embodiments, the network device 300 can include network condition assessment component 302, waveform selection component 304 and waveform assignment component 306 to facilitate such communications of a UE (e.g., UE 102) connected to the network device 300.

The network condition assessment component 302 can be configured to determine various network conditions associated with facilitating wireless communication of devices (e.g., UEs 102) attached thereto. As described supra, these network conditions can include scheduling constraints of the network device 300 in association with scheduling a plurality of UEs connected thereto. For example, based on connection of a UE to the network device 300, the network condition assessment component 302 can determine how the UE is scheduled (or is desired to be scheduled) relative to other UEs connected to thereto with respect to numerology, PRB assignments, spatial layer assignments, MCS assignment, etc. For instance, the network condition assessment component 302 can determine whether it has scheduled (or would like to schedule) the UE and other UEs connected thereto to different numerologies in relatively close or adjacent sub-bands. The network condition assessment component 302 can also determine network conditions that relate to current traffic conditions associated with servicing multiple UEs connected to the network device 300. For example, based on connection of a UE to the network device 300, the network condition assessment component 302 can determine the current amount of traffic/load of the network device and the types of traffic scheduled for the respective UEs serviced by the network device 300. The network condition assessment component 302 can also determine priority constraints associated with different types of traffic scheduled for the respective UEs and traffic capabilities of the respective UEs. The network condition assessment component 302 can also determine relative locations of the UEs 102 to one another and/or the network device, UE capabilities with respect to generating different types of traffic, current SNR experienced by the respective UE, current SINRs experienced by the UEs, and the like. In some embodiments, the network assessment component 302 can also be configured to continuously or regularly monitor changes in network conditions to facilitate directing UEs to change their currently employed waveform filtering scheme.

In one or more embodiments, the waveform selection component 304 can be configured to determine waveforms for application by the respective devices attached thereto based on these various network conditions. In particular, in various implementations in which a UE and the network device 300 are configured to employ multi-carrier waveforms with both wideband filtered and/or time domain window filtered configuration and a sub-band filtered configuration, the waveform selection component 304 can determine whether the UE should use the wideband filtered configuration, the time domain window filtered configuration, or a sub-band filtered configuration based on the current network conditions as applicable to the UE (e.g., one or more scheduling and/or traffic conditions associated with facilitating wireless communications for the UE and other UEs connected to the network device 300, relative distance of the UE to the network device 300, etc.). For example, in one embodiment, the UE and the network device 300 can be configured to employ OFDM and f-OFDM, wherein with f-OFDM at least some of various sub-bands or sub-carriers include different waveform parameters (i.e., different numerologies). In some embodiments, the UE and the network device 300 can also be configured to employ time domain windowing as opposed to wide-band filtering. Accordingly, based on the various current network conditions that effect wireless communications between the network device and the UE determined by the network condition assessment component 302, the waveform selection component 304 can determine whether the UE should apply wide-band filtering, time domain windowing filtering, or sub-band filtering.

In one or more embodiments, the waveform selection component 304 can employ a threshold based analysis in association with determining which waveform filtering scheme a UE should apply. According to these embodiment, the waveform selection component 304 can determine values for one or more defined network conditional parameters, including but not limited to: distances between PRB assignments for the UE and other scheduled UEs with mixed numerology, current traffic amount or load serviced by the network device, average bandwidth requirements associated with the current types of traffic scheduled for the UE and other scheduled UEs, relative distance between the UE and the network device, and the like. The waveform selection component 304 can then determine which waveform the UE should apply based on the values for the one or more defined network conditional parameters being above or below the respective threshold values.

In some embodiments, the waveform selection component 304 can further determine the numerology of the selected waveform based on the one or more conditions noted above. According to these embodiments, with respect to selection of a sub-band filtering scheme for a multi-carrier waveform including orthogonal sub-carriers, in some implementations, the waveform selection component 304 can further determine the specific numerologies of the respective sub-carriers. In some implementations, the waveform selection component 304 can also determine the respective filters associated with each of the different sub-carriers. For example, the waveform selection component 304 can determine respective filters to apply to the different sub-bands based on a minimization function that minimizing the interference spread to the adjacent sub-bands of the different numerology.

In some embodiments, the waveform selection component 304 can employ machine learning techniques to facilitate determine the most suitable waveform for application by a UE based on one or more traffic and/or scheduling conditions associated with facilitating wireless communications of the UE.

The waveform assignment component 306 can be configured to direct a device (e.g., a UE 102) connected to the network device 300 to apply the particular waveform selected and/or determined suitable by the waveform selection component 304. For example, in one or more embodiments, the waveform assignment component 306 can generate a waveform assignment message that includes information defining the particular waveform selected for the device. In some implementations, the waveform assignment message can include information defining the waveform parameters to apply to the respective sub-channels. In implementations in which the selected waveform comprises a sub-band filtered waveform, the waveform assignment message can also include filter information defining the respective filters to apply to each of the different sub-bands. The network device 300 can further send the network assignment message to the UE. The UE can further be configured to apply the waveform included in the waveform assignment message received from the network device 300. In some implementations, the network device 300 can send the network assignment message in a control channel of the wireless link established between the network device 300 and the UE. In other implementations, the waveform assignment component 306 can send the waveform assignment message using a higher layer signaling protocol. For example, the waveform assignment component 306 can send the waveform assignment message as an RRC message.

In various additional embodiments in which the network condition assessment 302 is configured to regularly monitor network conditions 302, the network condition assessment component 302 can identify changes in network conditions that effect a UE and the particular filtering scheme being employed by the UE (e.g., changes in scheduling constraints, changes in traffic load, changes in traffic type distribution, change in distance between the UE and the network device, etc.). For example, the network condition assessment component 302 can determine whether the network has selected or applied a new scheduling configuration for the UE and/or other UEs serviced by the network device 300 that results in the UE being scheduled to PRB that are relatively close (within a threshold block number degree of separation) to other UEs and wherein the respective UEs are scheduled with different numerology. According to this example, the network condition assessment component 302 can notify the waveform selection component 304 regarding the change in network conditions and the waveform selection component 304 can chose a different filtering scheme (e.g., sub-band filtering as opposed to previously employed wide-band filtering) for application by the UE. The waveform assignment component 306 can further send the UE an updated waveform assignment message directing the UE to apply the different filtering scheme. In some implementations, the updated waveform assignment message can be sent using a signaling layer protocol (e.g., layer 3 as oppose to layer 1) to send the updated waveform assignment message that is different from the signaling layer protocol employed to send the initial waveform assignment message.

Figure 4:
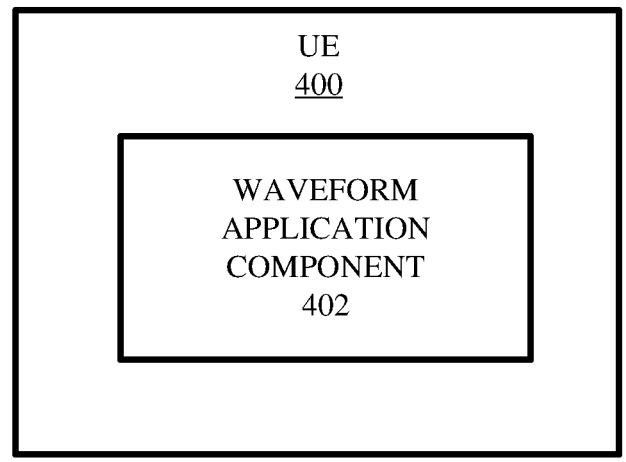
FIG. 4 is an illustration of example UE that facilitates network assisted waveform selection for UE uplink communications in accordance with various aspects and embodiments of the subject disclosure.

FIG. 4 is an illustration of example UE 400 that facilitates network assisted waveform selection for UE uplink communications in accordance with various aspects and embodiments of the subject disclosure. In various embodiments, the UE of system 100 can be or include UE 400. Although not shown, the UE 400 can comprise a processor and a memory that stores executable instructions that, when executed by the processor, facilitate performance of operations. Examples of said processor and memory, as well as other suitable computer or computing-based elements that can be by the UE in association with receiving and applying network selected waveforms for wireless communications, can be found with reference to FIG. 11, and can be used in connection with implementing one or more components of the UE. Repetitive description of like elements employed in respective embodiments is omitted for sake of brevity.

In the embodiment shown, the UE 400 can include a waveform application component 402. The waveform application component 402 can facilitate performance of wireless communications by the UE via one or more network devices of a wireless communication network (e.g., network device 300, network node 104, and the like) using dynamically assigned waveforms. For example, the waveform application component 402 can be configured to receive and interpret waveform assignment messages and updated waveform assignment messages sent thereto from a network device to which the UE 400 is attached. The waveform application component 402 can further be configured to control wireless signaling between the UE 400 and the network device (and/or one or more other devices) using the waveform defined in the waveform application message. For example, the waveform application component 402 can be configured to modulate signals transmitted by the UE 400 (e.g., uplink signals) using the assigned waveform (e.g., either a wideband filtered waveform, a time domain windowing filtered waveform or a sub-band filtered waveform).

In accordance with the subject network assisted waveform selection techniques, the network can determine the most suitable waveform for application by a UE based on various variable communication scenarios, current scheduling constraints, and traffic related conditions. In particular, in accordance with the subject network assisted waveform selection techniques, in some implementations, the network node can direct the UE to apply a sub-band filtering scheme thereby minimizing the interference spread to the adjacent subcarriers of the different numerology. In other implementations, the network node can direct the UE to employ a wideband filtering scheme to minimize the inference leakage to the adjacent wireless systems. By using the subject network assisted waveform techniques, the network can avoid the interference leakages to the other sub-carriers and facilitates multiple numerology deployment thereby improving the capacity of 5G systems. With the proposed techniques, the UE can also get benefit by avoiding the sharp filter implementation there by facilitating the low complexity implementation of the user terminals.

Figure 5:
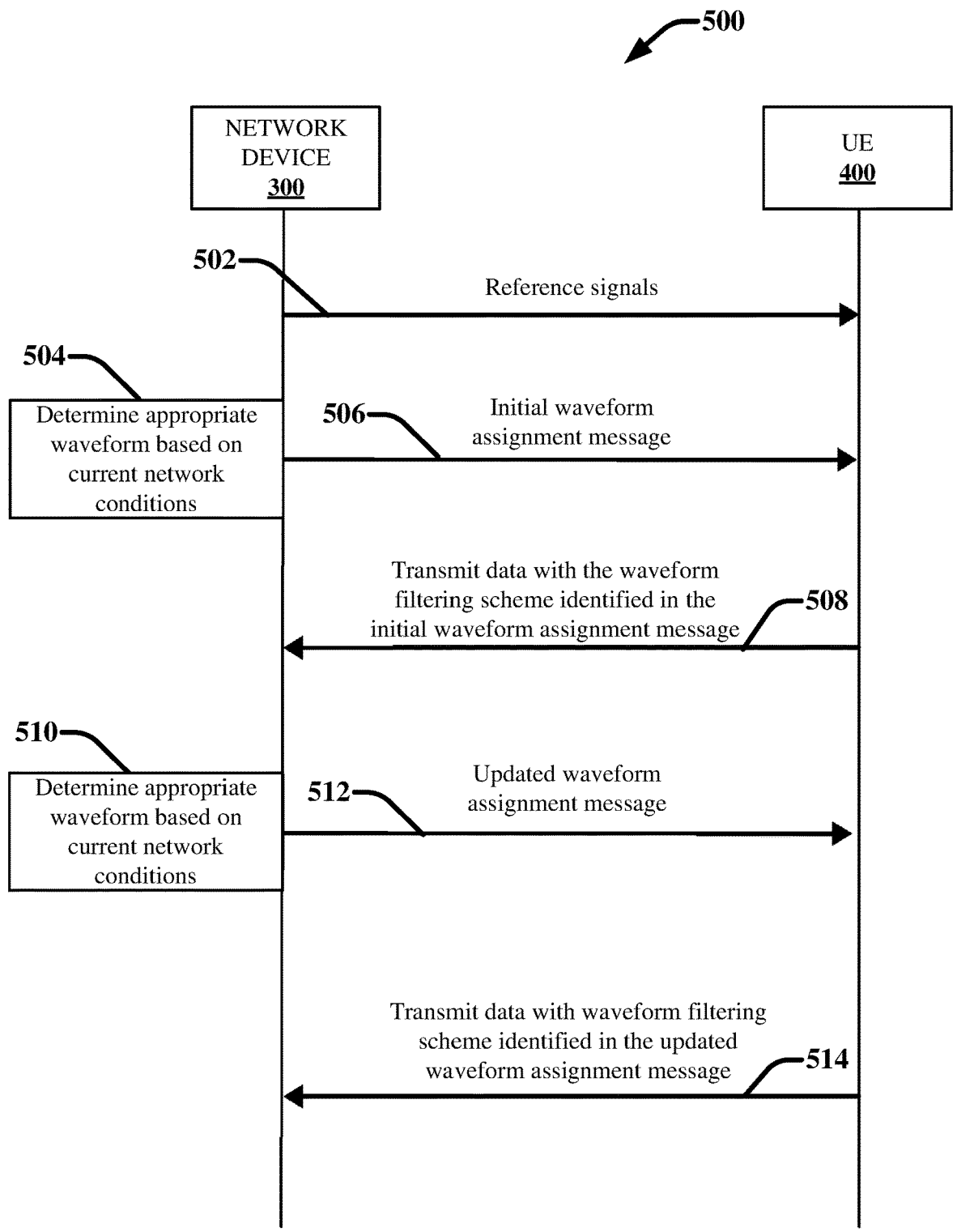
FIG. 5 illustrates an example signaling diagram of an example method that facilitates network assisted waveform selection for UE uplink communications in accordance with various aspects and embodiments of the subject disclosure.

FIG. 5 illustrates an example signaling diagram 500 of an example method that facilitates network assisted waveform selection for UE uplink communications in accordance with various aspects and embodiments of the subject disclosure. The signaling diagram 500 particularly describes an example signaling methodology that can be performed between network device 300 and UE 400. Repetitive description of like elements employed in respective embodiments is omitted for sake of brevity.

At 502, the network device 300 sends the UE reference signals in association with attachment of the UE to the network device 300. At 504, the network device determines an appropriate waveform filtering scheme for application by the UE 300 on uplink transmissions to the network device 300 based on current network conditions. Then at 506, the network device 300 sends the UE an initial waveform assignment message comprising information identifying the determined waveform filtering scheme and instructing the UE to apply the waveform filtering scheme. At 508, the UE transmits data to the network device with the waveform filtering scheme identified in the initial waveform assignment message. At 510, the network device again determines an appropriate waveform filtering scheme for application by the UE 300 on uplink transmissions to the network device 300 based on current network conditions. If the network device determines that a different waveform filtering scheme is now more appropriate for application by the UE than the initial waveform filtering scheme based on the current network conditions, then at 512, the network device 300 sends the UE an updated waveform assignment message. The updated waveform assignment message can comprise information identifying the updated waveform filtering scheme and instructing the UE to apply the updated waveform filtering scheme. At 514, the UE then transmits data to the network device 300 with the updated waveform filtering scheme identified in the updated waveform assignment message.

In accordance with signaling diagram 500, the network device 300 can schedule UEs with multiple numerologies adjacent to each other. In one implementation, the network can then direct the respective UEs to use sub-band filtering or wide-band filtering based on the scheduling and/or the various other network conditions described herein. In some implementations, the waveform assignment message can be sent in the control the control channel along with the scheduling information. Once a UE receives this information, it will apply either sub-band filtering or wideband filtering accordingly.

Figure 6:
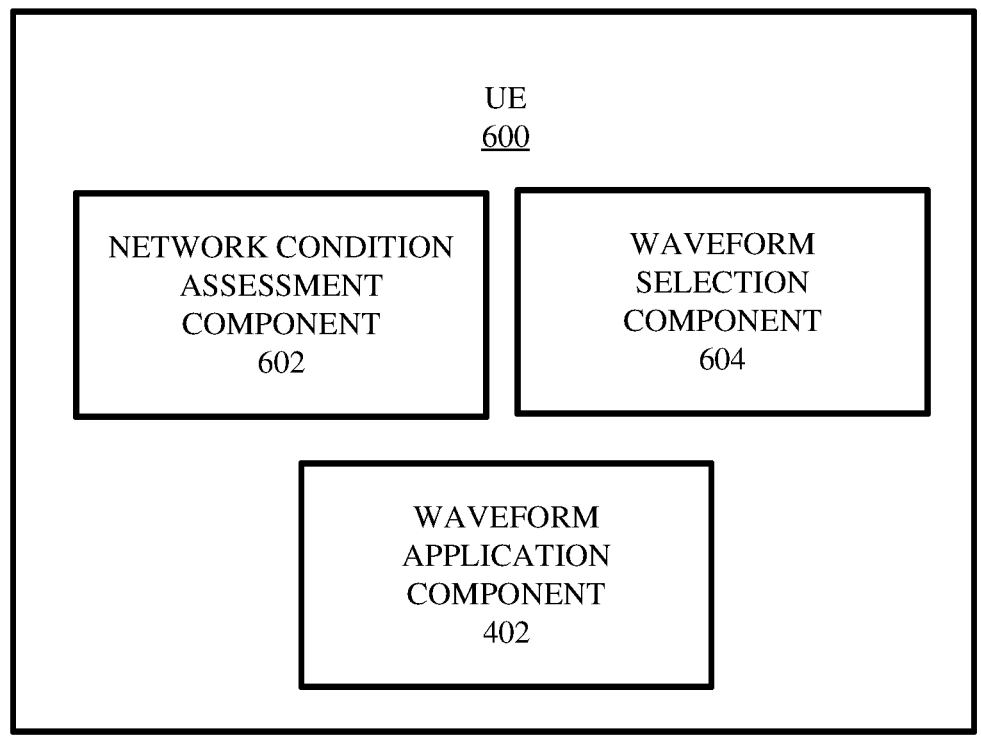
FIG. 6 is an illustration of an example UE that facilitates UE based waveform selection for UE uplink communications in accordance with various aspects and embodiments of the subject disclosure.

FIG. 6 is an illustration of example UE 600 that facilitates UE based waveform selection for UE uplink communications in accordance with various aspects and embodiments of the subject disclosure. UE component 600 can include same or similar components as UE 400. Repetitive description of like elements is omitted for sake of brevity. However, in the embodiment shown UE 600 is particularly configured to perform UE based waveform selection for UE uplink communications. According to this embodiment, the UE 600 can include network condition assessment component 602, and waveform selection component 604, and waveform assignment component 306.

In various embodiments, the network condition assessment component 602 can perform same or similar features as network condition assessment component 302. However, network condition assessment component 602 can be particularly configured to determine network condition information from the UE perspective as it pertains to the wireless connection between the UE 600 and the network node. For example, in association with establishing a wireless connection with a network node (e.g., network node 104, network device 300, and the like), the network condition assessment component 602 can receive (from the network node) or determine, information regarding network conditional parameters applicable to the UE. As previously described, these network conditions can include but are not limited to: PRB assignments for the UE, spatial layer assignments for the UE, MCS assignment for the UE, current traffic amount serviced by the network node, current traffic distribution service by the network node 104, distance between the UE to the network node 104, current SNR experienced by the UE, current SINR experienced by the UE, and the like.

The waveform selection component 604 can also perform same or similar functions as the waveform selection component 304. For example, based on the current network conditions determined by the network condition assessment component 602 the waveform selection component 604 can be configured to select either wideband filtering, time domain windowing filtering, or sub-band filtering for uplink communications using same or similar analysis techniques employed by the waveform selection component 304. For example, the waveform selection component 604 can employ a threshold based analysis wherein predefined threshold values for one or more network conditional parameters are set by the network and provided to the UE 600. The waveform selection component 604 can further choose to apply wideband filtering, time domain windowing filtering, or sub-band filtering based on measured or determined values for the one or more network parameters being above or below the threshold values.

For example, the waveform selection component 604 can select application sub-band filtering when the network conditions indicate a first traffic environment (e.g., high traffic volumes), and wideband filtering when the network conditions indicate a second traffic environment (e.g., low traffic volumes). In another example, the waveform selection component 604 can select sub-band filtering as opposed to wideband filtering when the UE is scheduled to PRB assignments that are separated from other scheduled UEs in the same OFDM waveform by less than a threshold block separation amount. In another example, the waveform selection component 604 can select sub-band filtering as opposed to wideband filtering when scheduled to spatial layer assignments that are greater than a threshold amount. In another example, the waveform selection component 604 can select sub-band filtering as opposed to wide-band filtering when scheduled to a particular MCS. In another example, the waveform selection component 604 can select sub-band filtering as opposed to wideband filtering based on being separated from the network node 104 by a distance greater than threshold distance. In another example, t the waveform selection component 604 can select sub-band filtering as opposed to wideband filtering based on detection of relatively high SNR or SINR values. In various embodiments, the waveform selection component 604 can be configured to employ one or more algorithms that relate sub-band filtering and wideband filtering or time domain windowing filtering to a combination of values for different measured network conditional parameters (e.g., traffic related parameters, scheduling related parameters, UE separation distance, SNR, SINR, etc.).

In accordance with UE based waveform selection, the waveform assignment component 306 can be configured to apply the particular waveform selected by the waveform selection component 604. For example, in response to selection of a particular waveform by the waveform selection component 604, the waveform assignment component 306 can be configured to direct the UE 600 to transmit data to the network node using the selected waveform.

Figure 7:
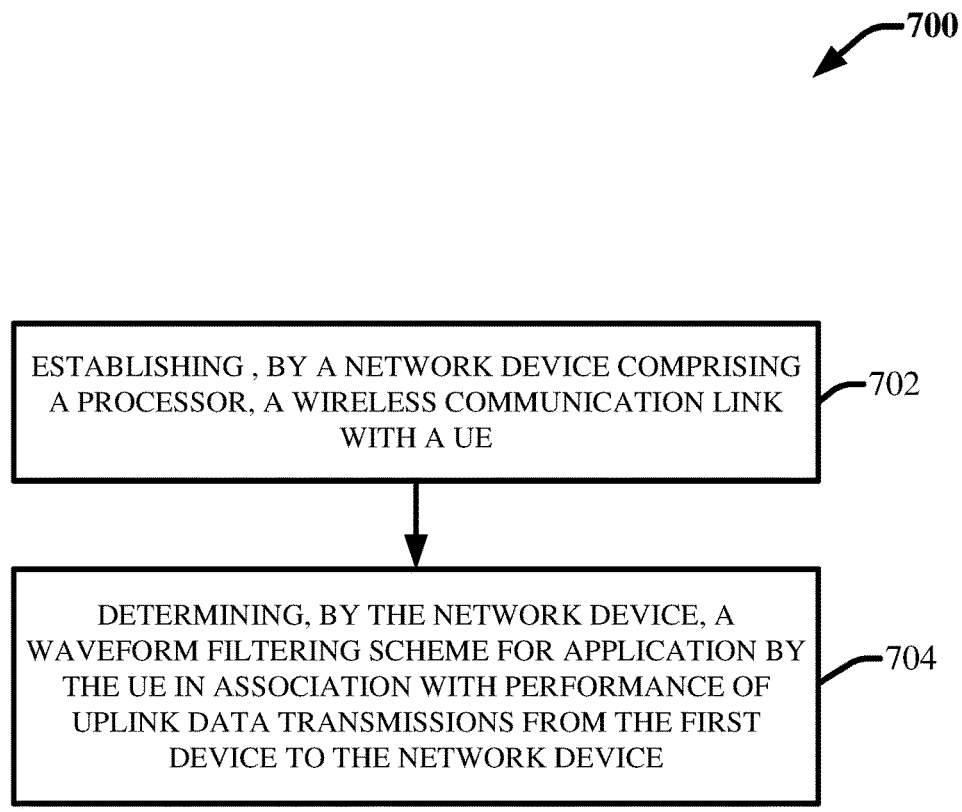
FIG. 7 illustrates an example method that facilitates network assisted waveform selection for UE uplink communications in accordance with various aspects and embodiments of the subject disclosure.
Figure 8:
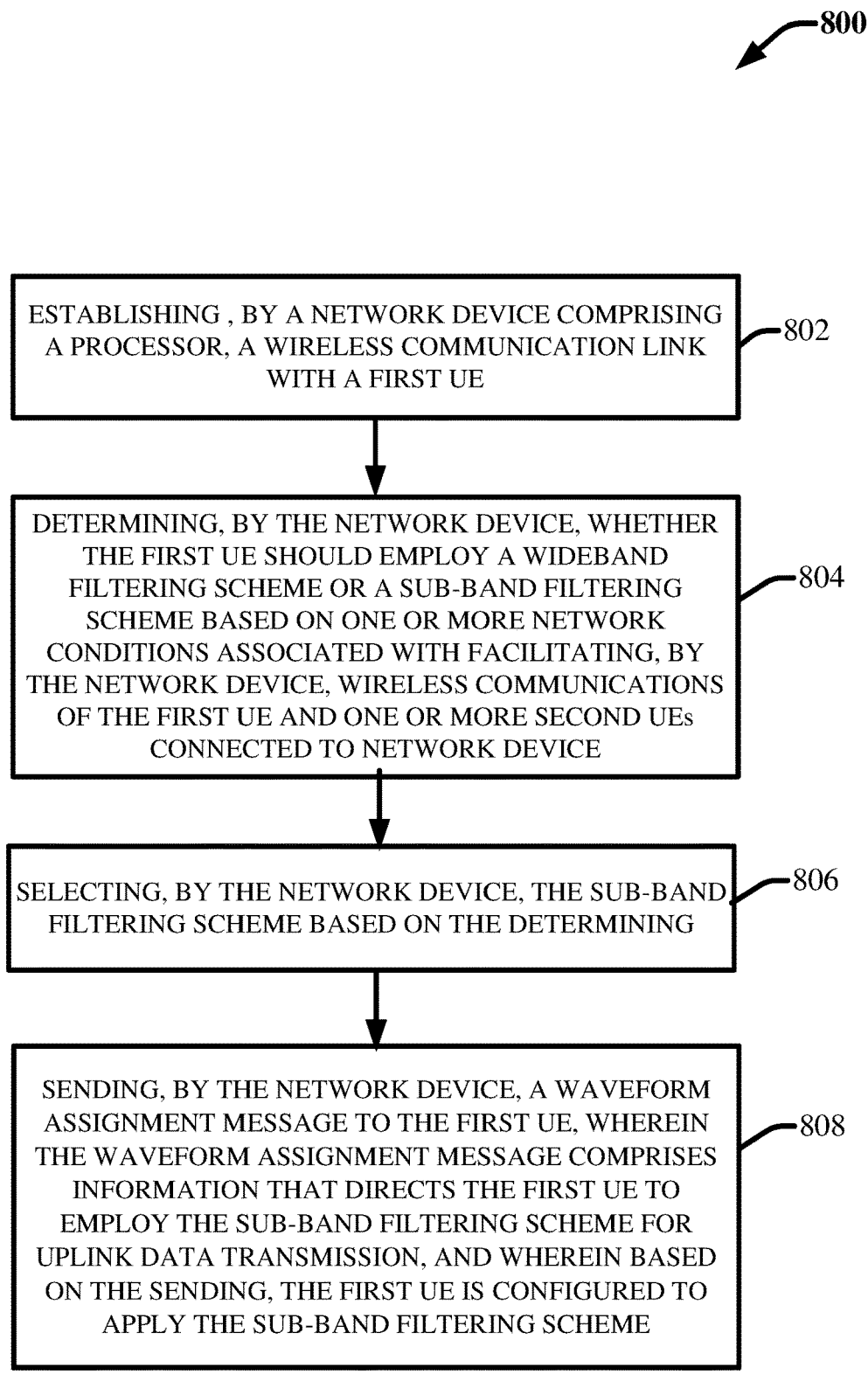
FIG. 8 illustrates another example method that facilitates network assisted waveform selection for UE uplink communications in accordance with various aspects and embodiments of the subject disclosure.
Figure 9:
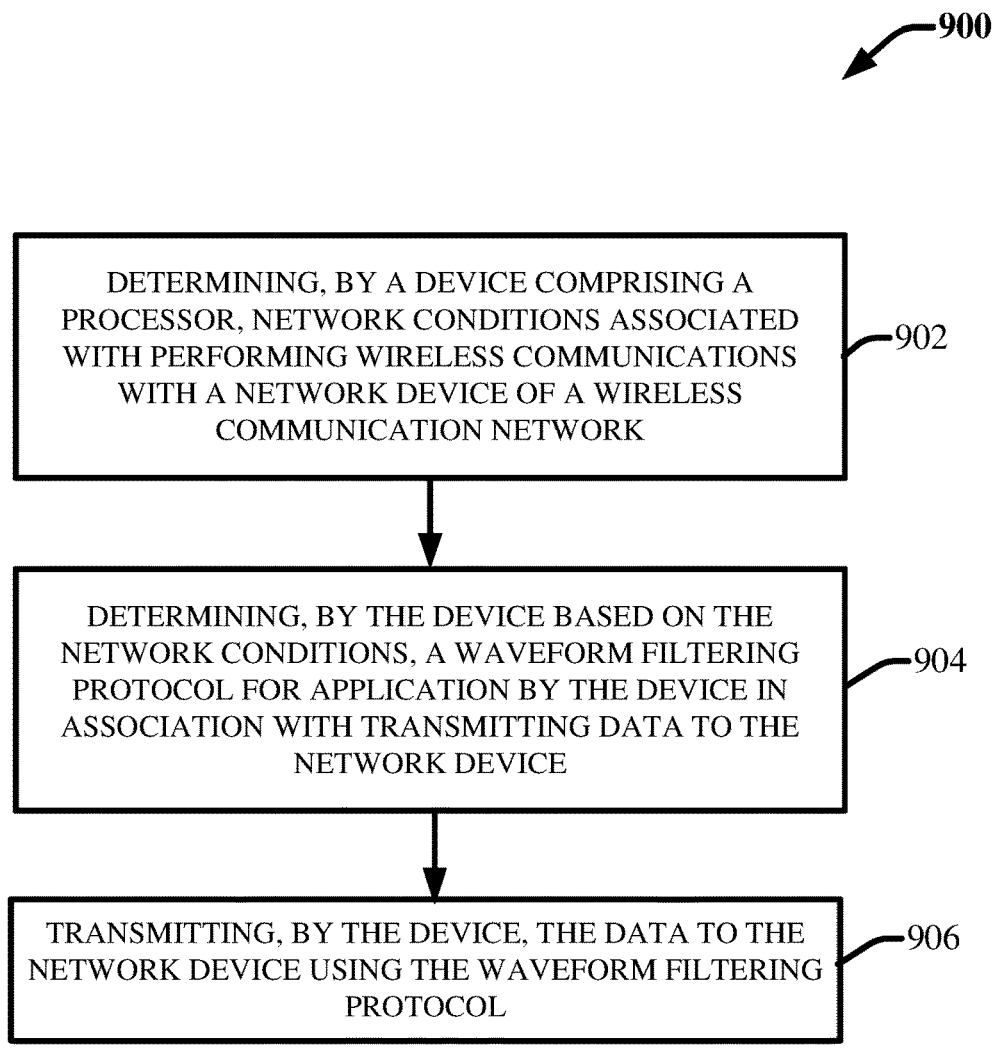
FIG. 9 illustrates an example method that facilitates UE based waveform selection for UE uplink communications in accordance with various aspects and embodiments of the subject disclosure.

In view of the example system(s) described above, example method(s) that can be implemented in accordance with the disclosed subject matter can be better appreciated with reference to flowcharts in FIGS. 7-9. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 illustrates an example method 700 that facilitates network assisted waveform selection for UE uplink communications in accordance with various aspects and embodiments of the subject disclosure. Repetitive description of like elements employed in respective embodiments is omitted for sake of brevity.

At 702, a network device comprising a processor (e.g., network node 104, network device 300, and the like), establishes a wireless connection link with a UE (e.g., UE 102, UE 400 and the like). At 704, the network device determines a waveform filtering scheme for application by the UE in association with performance of uplink data transmission from the UE to the network device (e.g., via waveform selection component 304). For example, the network device can select a sub-band filtering scheme, a wideband filtering scheme or a time domain window filtering scheme based on one or more network conditions association with facilitating wireless communications of the UE and one or more other UEs attached to the network device. For example, these network conditions can be based on scheduling constraints, traffic conditions, load on the network device, and distances between respective UEs.

FIG. 8 illustrates another example method 800 that facilitates network assisted waveform selection for UE uplink communications in accordance with various aspects and embodiments of the subject disclosure. Repetitive description of like elements employed in respective embodiments is omitted for sake of brevity.

At 802, a network device comprising a processor establishes a wireless communication link with a first UE. At 804, the network device determines whether the first UE should employ a wideband filtering scheme or a sub-band filtering scheme based on one or more network conditions associated with facilitating, by the network device, wireless communications of the first UE and one or more second UEs connected to network device. At 806, the network device selects the sub-band filtering scheme based on the determining. Then at 808, the network device sends a waveform assignment message to the first UE, wherein the waveform assignment message comprises information that directs the first UE to employ the sub-band filtering scheme for uplink data transmission, and wherein based on the sending, the first UE is configured to apply the sub-band filtering scheme.

FIG. 9 illustrates an example method 900 that facilitates UE based waveform selection for UE uplink communications in accordance with various aspects and embodiments of the subject disclosure. Repetitive description of like elements employed in respective embodiments is omitted for sake of brevity.

At 902, a device comprising a processor (e.g., UE 102, UE 600, and the like) determines network conditions associated with performing wireless communications with a network device of a wireless communication network. At 904, the device determines, based on the network conditions, a waveform filtering protocol for application by the device in association with transmitting data to the network device. At 906, the device transmits the data to the network device using the waveform filtering protocol.

Figure 10:
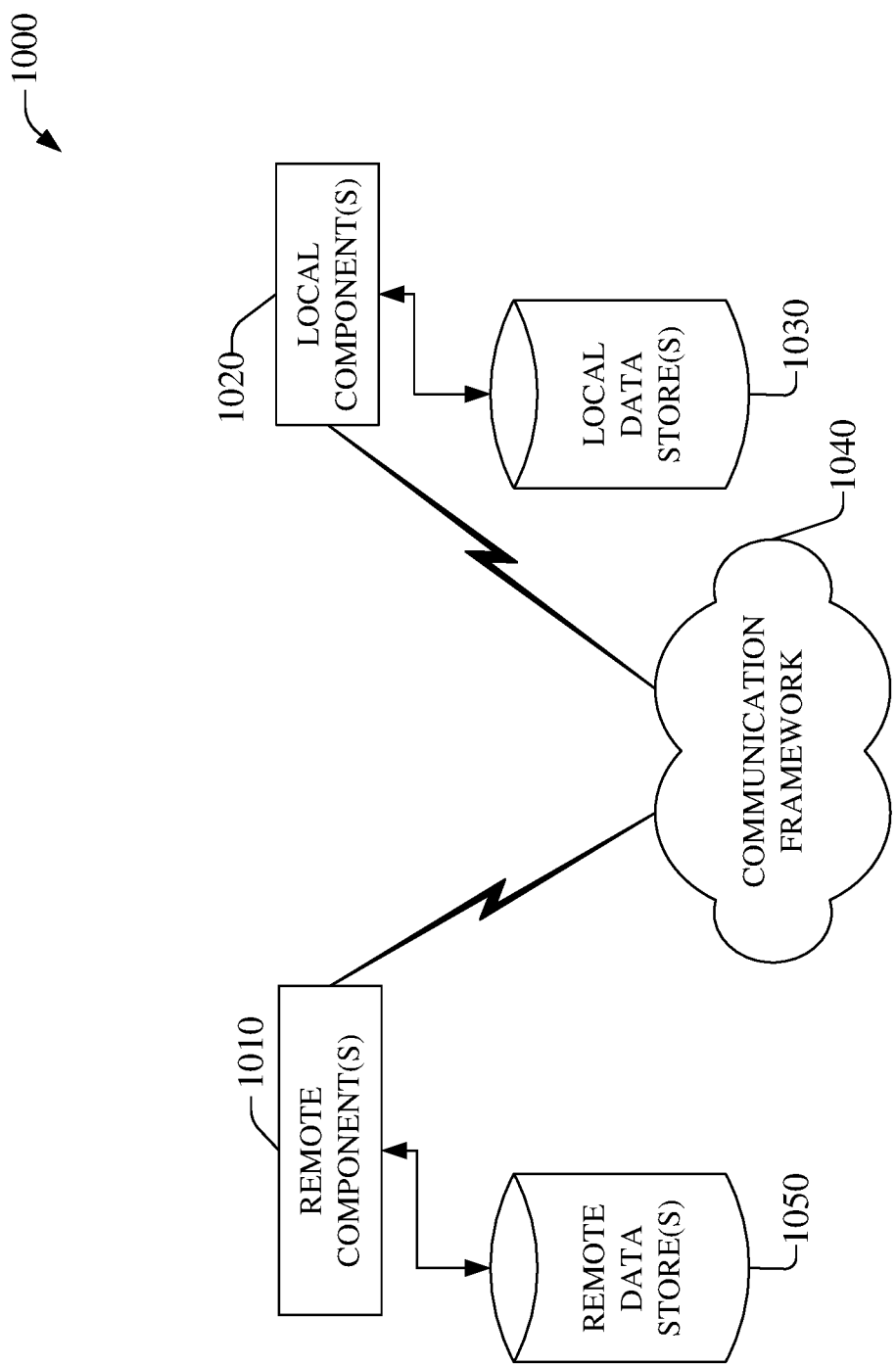
FIG. 10 depicts an example schematic block diagram of a computing environment with which the disclosed subject matter can interact.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can comprise servers, personal servers, wireless telecommunication network devices, RAN device(s), etc. As an example, remote component(s) 1010 can be network node 104, network device 300 and the like.

The system 1000 also comprises one or more local component(s) 1020. The local component(s) 1020 can be hardware and/or software (e.g., threads, processes, computing devices). In some embodiments, local component(s) 1020 can comprise, for example, UE 102, 400, 500, etc.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via an LTE network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
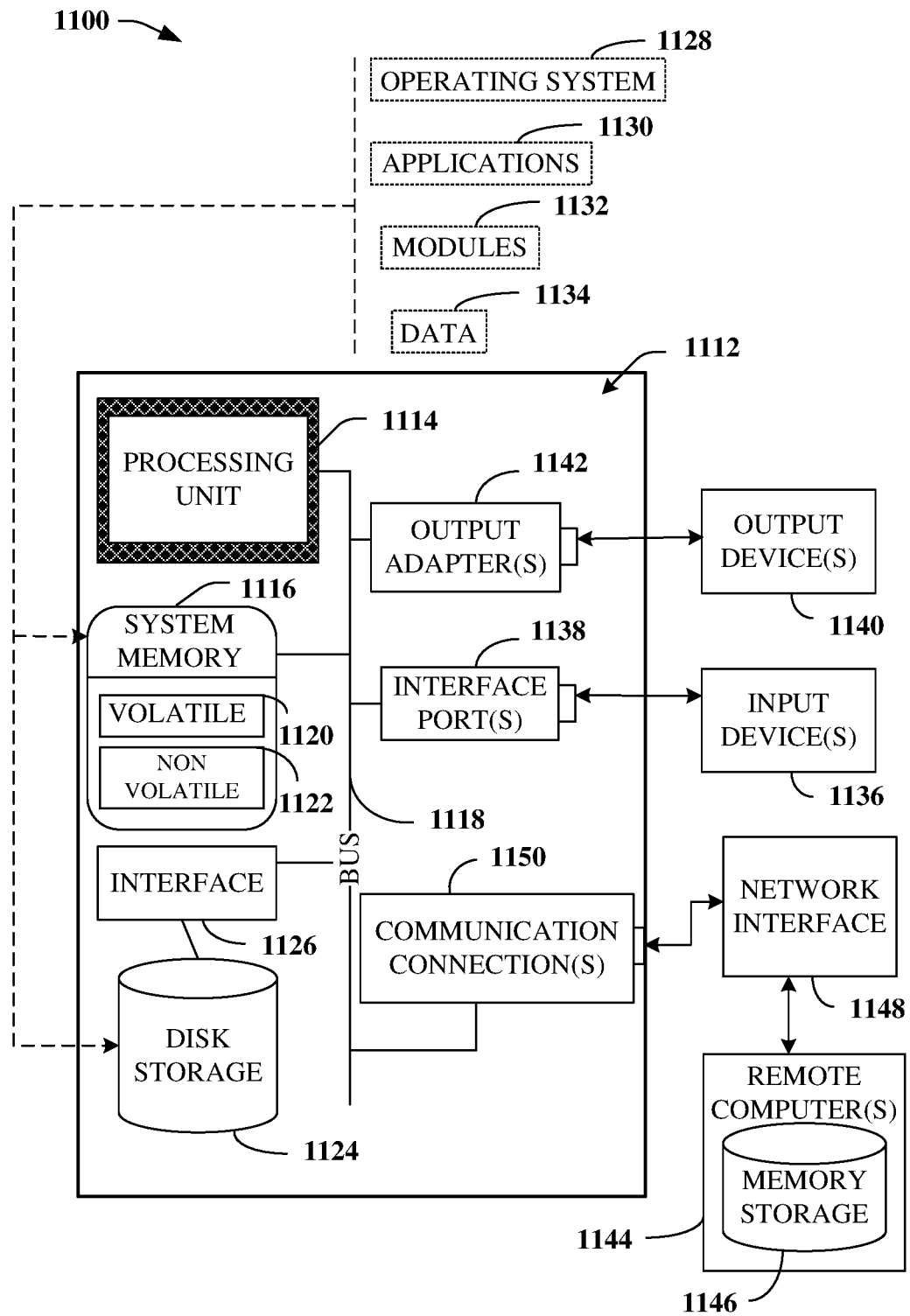
FIG. 11 illustrates an example block diagram of a computing system operable to execute the disclosed systems and methods in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1120 (see below), nonvolatile memory 1122 (see below), disk storage 1124 (see below), and memory storage 1146 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, notebook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, a UE (e.g., UE 102 and 400), a network node (e.g., network node 104 and 300), comprises a processing unit 1114, a system memory 1116, and a system bus 1118. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 11114), and small computer systems interface.

System memory 1116 can comprise volatile memory 1120 and nonvolatile memory 1122. A basic input/output system, containing routines to transfer information between elements within computer 1112, such as during start-up, can be stored in nonvolatile memory 1122. By way of illustration, and not limitation, nonvolatile memory 1122 can comprise read only memory, programmable read only memory, electrically programmable read only memory, electrically erasable read only memory, or flash memory. Volatile memory 1120 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1112 can also comprise removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, flash memory card, or memory stick. In addition, disk storage 1124 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1124 to system bus 1118, a removable or non-removable interface is typically used, such as interface 1126.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising generating an RRC connection release message further comprising alterative band channel data.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1112. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 comprise, for example, a serial port, a parallel port, a game port, a universal serial bus, an infrared port, a Bluetooth port, an IP port, or a logical port associated with a wireless service, etc. Output device(s) 1140 use some of the same type of ports as input device(s) 1136.

Thus, for example, a universal serial bus port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 comprise, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1112. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can storing and/or processing data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
scheduling wireless communications between a primary network node device and secondary network devices within a shared carrier bandwidth of a wireless communication network and using different numerology configurations for the secondary network devices, wherein the different numerology configurations comprise different waveform parameters, and wherein the different waveform parameters comprise a symbol duration parameter and a cyclic prefix length parameter; and
selecting respective bandwidth parts of the shared carrier bandwidth for usage by the secondary network devices in association with performance of the wireless communications with the primary network node device based on the different numerology configurations when the different numerology configurations are scheduled for the secondary network devices.

2. The system of claim 1, wherein the different waveform parameters further comprise a subcarrier spacing parameter.

3. The system of claim 1, wherein the operations further comprise:
sending scheduling information to the secondary network devices that identifies the respective bandwidth parts for the usage by the secondary network devices, wherein, based on the sending, the secondary network devices are configured to employ the respective bandwidth parts for the performance of the wireless communications.

4. The system of claim 1, wherein the selecting the respective bandwidth parts comprises selecting a first grouping of the shared carrier bandwidth for a first secondary network device of the secondary network devices based on the first secondary network device being scheduled with first waveform parameters of the different waveform parameters and selecting a second grouping of the shared carrier bandwidth for a second secondary network device of the secondary network devices based on the second secondary network device being scheduled with second waveform parameters of the different waveform parameters.

5. The system of claim 1, wherein the operations further comprise:
based on a change in a condition of the wireless communication network, selecting a different bandwidth part of the shared carrier bandwidth for usage by at least one secondary network device of the secondary network devices in association with performance of at least some of the wireless communications with the primary network node device, the different bandwidth part being different than a currently selected bandwidth part for the usage by the at least one secondary network device.

6. The system of claim 5, wherein the operations further comprise:
sending updated scheduling information to the at least one secondary network device, wherein the updated scheduling information identifies the different bandwidth part, and wherein, based on the sending the updated scheduling information, the at least one secondary network device is configured to employ the different bandwidth part for the at least some of the wireless communications with the primary network node device.

7. The system of claim 6, wherein the sending the scheduling information comprises sending the scheduling information using a first signaling layer protocol, and wherein the sending the updated scheduling information comprises sending the updated scheduling information using a second signaling layer protocol that is different than the first signaling layer protocol.

8. The system of claim 1, wherein the operations further comprise:
determining a traffic condition associated with the wireless communication network, and wherein the selecting comprises selecting the respective bandwidth parts based on the traffic condition.

9. The system of claim 1, wherein the operations further comprise:
determining relative locations of the secondary network devices to the primary network node device, and wherein the selecting further comprises selecting the respective bandwidth parts based on the relative locations.

10. The system of claim 1, wherein the respective bandwidth parts comprise different groups of consecutive physical resources blocks.

11. A method, comprising:
scheduling, by a first device comprising a processor, wireless communications between the first device and second devices within a shared carrier bandwidth of a wireless communication network and using different numerology configurations for the second devices, wherein the different numerology configurations comprise different waveform parameters, and wherein the different waveform parameters comprise a symbol duration parameter and a cyclic prefix length parameter; and
selecting, by the first device, respective bandwidth parts of the shared carrier bandwidth for usage by the second devices in association with performance of the wireless communications with the first device based on the different numerology configurations in response to the different numerology configurations being scheduled for the second devices.

12. The method of claim 11, wherein the different waveform parameters further comprise a subcarrier spacing parameter.

13. The method of claim 11, further comprising:
sending, by the first device, scheduling information to the second devices identifying the respective bandwidth parts scheduled for the second devices, wherein, based on the sending, the second devices are configured to employ the respective bandwidth parts to transmit data to the first device.

14. The method of claim 11, wherein the selecting comprises selecting a first part of the shared carrier bandwidth for a device of the second devices and selecting a second part of the shared carrier bandwidth for a different device of the second devices, and wherein the first part comprises a wider portion of the available bandwidth relative to the second part.

15. The method of claim 11, wherein the respective bandwidth parts correspond to different divisions of the shared carrier bandwidth.

16. A non-transitory machine-readable storage medium, comprising executable instructions that, when executed by a processor, facilitate performance of operations, comprising:
facilitating wireless communications between a primary network node device and secondary network devices within a shared carrier bandwidth of a wireless communication network and using different numerology configurations for the secondary network devices, wherein the different numerology configurations comprise different waveform parameters, and wherein the different waveform parameters comprise a symbol duration parameter and a cyclic prefix length parameter; and
selecting respective bandwidth parts of the shared carrier bandwidth for usage by the secondary network devices in association with performance of the wireless communications with the primary network node device based on the different numerology configurations, wherein the different numerology configurations are scheduled for the secondary network devices.

17. The non-transitory machine-readable storage medium of claim 16, wherein the different waveform parameters further comprise a subcarrier spacing parameter.

18. The non-transitory machine-readable storage medium of claim 16, wherein the operations further comprise:
sending scheduling information to the secondary network devices that identifies the respective bandwidth parts for the usage by the secondary network devices, wherein, based on the sending, the secondary network devices are configured to employ the respective bandwidth parts for the performance of the wireless communications.

* * * * *